United States Patent
Herzel

(10) Patent No.: US 9,544,499 B2
(45) Date of Patent: Jan. 10, 2017

(54) SYSTEM APPARATUS AND DEVICE FOR FACILITATING NETWORK EDGE DEVICE BACKUP AND METHODS OF OPERATION THEREOF

(71) Applicant: Roni Herzel, Tel Aviv (IL)

(72) Inventor: Roni Herzel, Tel Aviv (IL)

(73) Assignee: ENERGY RE-CONNECT LTD., Tel Aviv (IL)

( * ) Notice: Subject to any disclaimer, the term of this patent is extended or adjusted under 35 U.S.C. 154(b) by 0 days.

(21) Appl. No.: 14/664,871

(22) Filed: Mar. 22, 2015

(65) Prior Publication Data

US 2015/0256748 A1    Sep. 10, 2015

Related U.S. Application Data

(63) Continuation-in-part of application No. 14/082,152, filed on Nov. 17, 2013.

(51) Int. Cl.
| | | |
|---|---|---|
| *G06F 1/30* | (2006.01) | |
| *H04L 12/10* | (2006.01) | |
| *H04N 5/232* | (2006.01) | |
| *H04N 7/18* | (2006.01) | |
| *H04N 5/765* | (2006.01) | |
| *H04N 5/77* | (2006.01) | |
| *H04N 5/63* | (2006.01) | |

(52) U.S. Cl.
CPC ............ *H04N 5/23241* (2013.01); *G06F 1/30* (2013.01); *H04L 12/10* (2013.01); *H04N 5/765* (2013.01); *H04N 5/772* (2013.01); *H04N 7/181* (2013.01); *H04N 5/63* (2013.01)

(58) Field of Classification Search
CPC ...... H04N 5/23241; H04N 5/63; H04N 5/765; H04N 5/772; H04N 7/181; H04N 17/002; H04L 12/10; G06F 1/30
See application file for complete search history.

(56) References Cited

U.S. PATENT DOCUMENTS

| | | | | |
|---|---|---|---|---|
| 4,665,415 A | * | 5/1987 | Esaki ................... | H01L 29/205 257/190 |
| 4,783,695 A | * | 11/1988 | Eichelberger ....... | H01L 23/5385 257/668 |
| 7,304,828 B1 | * | 12/2007 | Shvartsman ........... | H02H 3/085 361/93.1 |
| 8,284,798 B2 | * | 10/2012 | Diab ....................... | H04L 12/66 348/148 |
| 2008/0168283 A1 | * | 7/2008 | Penning ................. | G06F 1/263 713/310 |

(Continued)

*Primary Examiner* — Thai Tran
*Assistant Examiner* — Christopher T Braniff
(74) *Attorney, Agent, or Firm* — Vladimir Sherman; Professional Patent Solutions

(57) ABSTRACT

Disclosed is a system apparatus and device for facilitating the backup of network edge devices, such as video cameras, and methods of operation thereof. A monitoring circuit(s) may detect inoperable electrical power condition(s) (IEPC) on the power-line of a network edge device. Upon detection of an IEPC a backup power source may provide electrical power to the edge device. Upon detection of a connectivity fault between the edge device and its packet sink, a packet sink emulator may emulate a packet sink of the edge device. The disclosed system apparatus and device may be implemented as a SoC (System on Chip).

20 Claims, 22 Drawing Sheets

Exemplary SoC Design

(56) References Cited

U.S. PATENT DOCUMENTS

| | | | | |
|---|---|---|---|---|
| 2008/0294917 A1* | 11/2008 | Khan | .................... | G06F 1/3209 713/310 |
| 2009/0108677 A1* | 4/2009 | Walter | ................ | H02M 3/1582 307/80 |

* cited by examiner

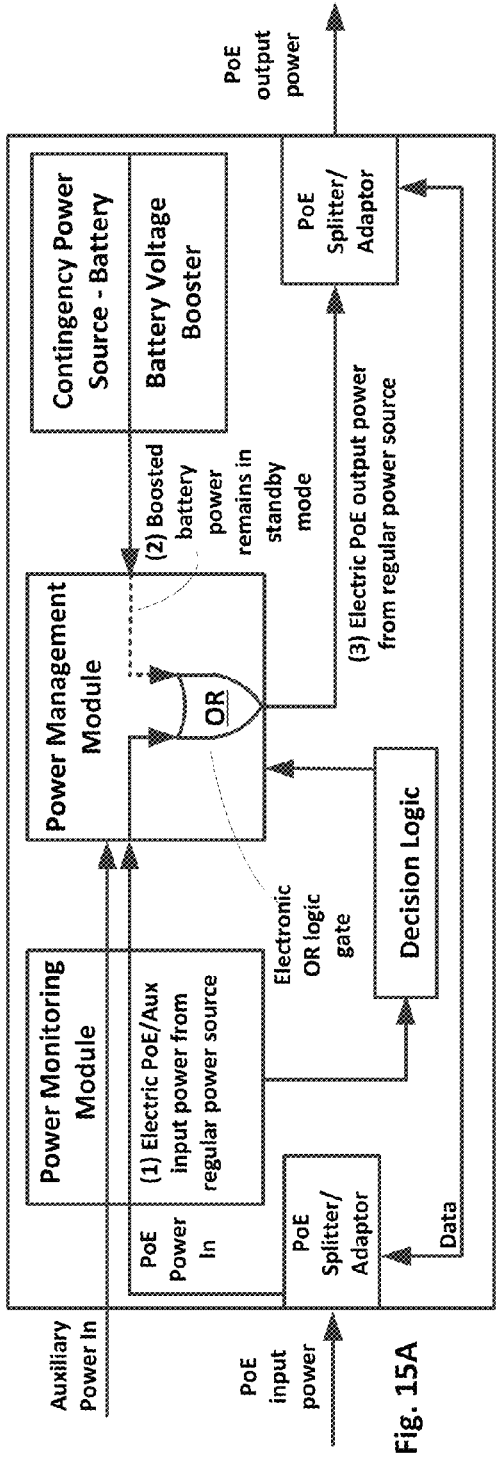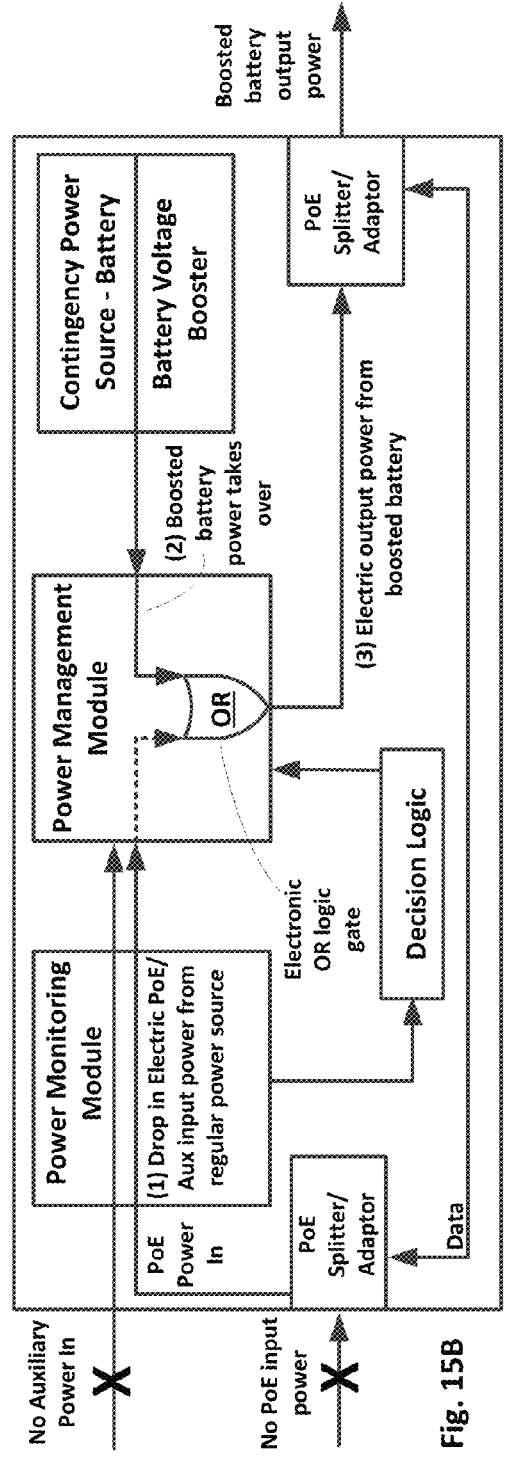
Fig. 15A
Fig. 15B

SYSTEM APPARATUS AND DEVICE FOR FACILITATING NETWORK EDGE DEVICE BACKUP AND METHODS OF OPERATION THEREOF

PRIORITY CLAIMS

The present application is a Continuation In Part (CIP) of U.S. patent application Ser. No. 14/082,152, filed Nov. 17, 2013. The Ser. No. 14/082,152 U.S. patent application claims priority from U.S. Provisional Patent Application No. 61/727,713, entitled: "A System Apparatus and Device for Facilitating Network Camera Backup and Methods of Operation Thereof", filed by the inventor of the present application on Nov. 18, 2012, which is hereby incorporated by reference into the present application in its entirety.

FIELD OF THE INVENTION

The present invention generally relates to the field of Power over Ethernet (hereinafter: 'PoE') and Network gear for Edge Device facilitation. More specifically, the present invention relates to a system apparatus and device for facilitating network edge device backup and continuous operation, and methods operation thereof.

BACKGROUND

An Internet protocol camera, or IP camera, is a type of digital video camera commonly employed for surveillance, and which unlike analog closed circuit television (CCTV) cameras can send and receive data via a computer network and the Internet. Although most cameras that do this are webcams, the term "IP camera" or "netcam" is usually applied only to those used for surveillance.

There are two kinds of IP cameras:

Centralized IP cameras, which require a central Network Video Recorder (NVR) to handle the recording, video and alarm management.

Decentralized IP cameras, which do not require a central Network Video Recorder (NVR), as the cameras have recording functionality built-in and can thus record directly to digital storage media, such as flash drives, hard disk drives or network attached storage.

The first centralized IP camera was released in 1996 by Axis Communications. It was called the Axis Neteye 200 and was developed by the team of Martin Gren and Carl-Axel Alm. It used a custom web server internal to the camera. In late 1999, the company started using embedded Linux to operate its cameras. Axis also released documentation for its low-level API called "VAPIX", which builds on the open standards of HTTP and real time streaming protocol (RTSP). This open architecture was intended to encourage third-party software manufacturers to develop compatible management and recording software.

The first decentralized IP camera was released in 1999 by Mobotix. The camera's Linux system contained video, alarm and recording management functionality, thus the camera system did not require licensed video management software to manage the recording, event and video management.

The first IP camera with onboard video content analytics (VCA) was released in 2005 by Intellio. This camera was capable of detecting a number of different events, such as an object was stolen, a human crosses a line, a human entered a predefined zone, a car goes the wrong way.

IP cameras are available at resolutions from 0.3 (VGA resolution) to 20 megapixels. As in the consumer TV business, in the early 21st century, there has been a shift towards high-definition video resolutions, e.g. 720p or 1080i and 16:9 widescreen format.

Taking the above into account, there clearly remains a need, in the field of network and IP Edge-Devices/Cameras, for better more efficient systems, apparatuses, devices and methods for network camera backup, and other network edge device backup, that may allow for network cameras and other network edge device to continue their operation while coping with various power, communication, storage and tampering scenarios.

SUMMARY OF THE INVENTION

Below are described a number of novel, innovative features of a system apparatus and device for facilitating network edge device (e.g. camera) backup and methods of operation thereof.

According to some embodiments of the present invention, an apparatus/device for facilitating network camera backup may be positioned between a networked camera (e.g. in or next to camera housing) and the network side of the camera to/from which data is communicated and from which regular electric power is supplied to the camera (e.g. data and power as PoE).

According to some embodiments of the present invention, the apparatus/device for facilitating network camera backup may comprise: a First PoE Splitter/Adaptor, on the network side of the apparatus/device, for separating the PoE provided data and power connections; a Power Monitoring Module for monitoring the quality and extracting electric parameters of electric power supplied by a regular power source; a Decision Logic for determining, based on the extracted electric parameters, if a drop in power quality has occurred and issuing a respective power source switching command; a Power Management Module including: a Charging Circuit for charging of, and a Backup Supply Circuit for switching from the regular power source to, a Contingency Power Source, in response to a power source switching command from the decision logic; and a Second PoE Splitter/Adaptor, on the camera side of the apparatus/device, for merging the separated data connection and the power connection of the contingency power source and relaying as PoE to the camera.

According to some embodiments of the present invention, the apparatus/device for facilitating network camera backup may be implemented as an independent unit that may be positioned within the housing of a network camera, and/or outside the housing, and possibly in substantial proximity to it, on the network side of the camera. According to some embodiments, the apparatus/device for facilitating network camera backup may be implemented as an integral, or partially integral, part of a network camera such that at least some of the components of the apparatus are integrated and/or embedded into camera circuit boards (e.g. main circuit board) also handling other camera operation related functionalities. Any of the features described hereinafter, or parts thereof, may be at least partially implemented by either: a network camera comprising integrated network camera backup functionalities and/or a standalone network camera backup apparatus functionally associated with a network camera.

Furthermore, the present invention may be implemented in various infrastructure, power, communication, and cabling environments. Accordingly, a variety of media converters and/or adapters, for switching between different physical Medias and/or converting analog signals/data to digital format and vice versa, may be used as part of many connection configurations of an apparatus in accordance with the present invention. According to some exemplary embodiments, a media converter may convert signal(s) travelling over fiber-optic, Coax, RJ45 and/or any other type of data carrying medium (e.g. cables) known today or to be devised in the future, to Ethernet compatible medium that may also be used for carrying power (e.g. PoE). An apparatus/device for facilitating network camera backup may, accordingly, comprise a media converter on its network side to convert network data signals of other medium types to over Ethernet signals; and/or a media converter on its camera side to convert camera data signals of other medium types to over Ethernet signals.

According to some embodiments of the present invention, a system, apparatus, device, and/or method for facilitating network edge device backup and continuous operation, may be implemented on an electronic circuit as a System on Chip (SoC), wherein system logic and/or functionalities are integrated onto a circuit.

According to some embodiments, a System on Chip (SoC) for facilitating network edge device backup and continuous operation may include: (1) an Integrated Circuit Power Supply Channel from a PoE line, and (2) Integrated Circuit Power Supply Channel(s) from at least one additional contingency/backup power source(s). The Power Supply Channels may be simultaneously feeding the circuit; each channel may be routed through one or more respective (3) Diode(s), Diodes equivalents and/or Active Switches.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

FIGS. 15A and 15B are block diagrams showing the main modules and operation steps of an exemplary system for facilitating network camera backup, wherein an Electronic OR logic gate switches between boosted battery power (15B) and PoE input power (15A), in accordance with some embodiments of the present invention;

DETAILED DESCRIPTION

Figure 1:
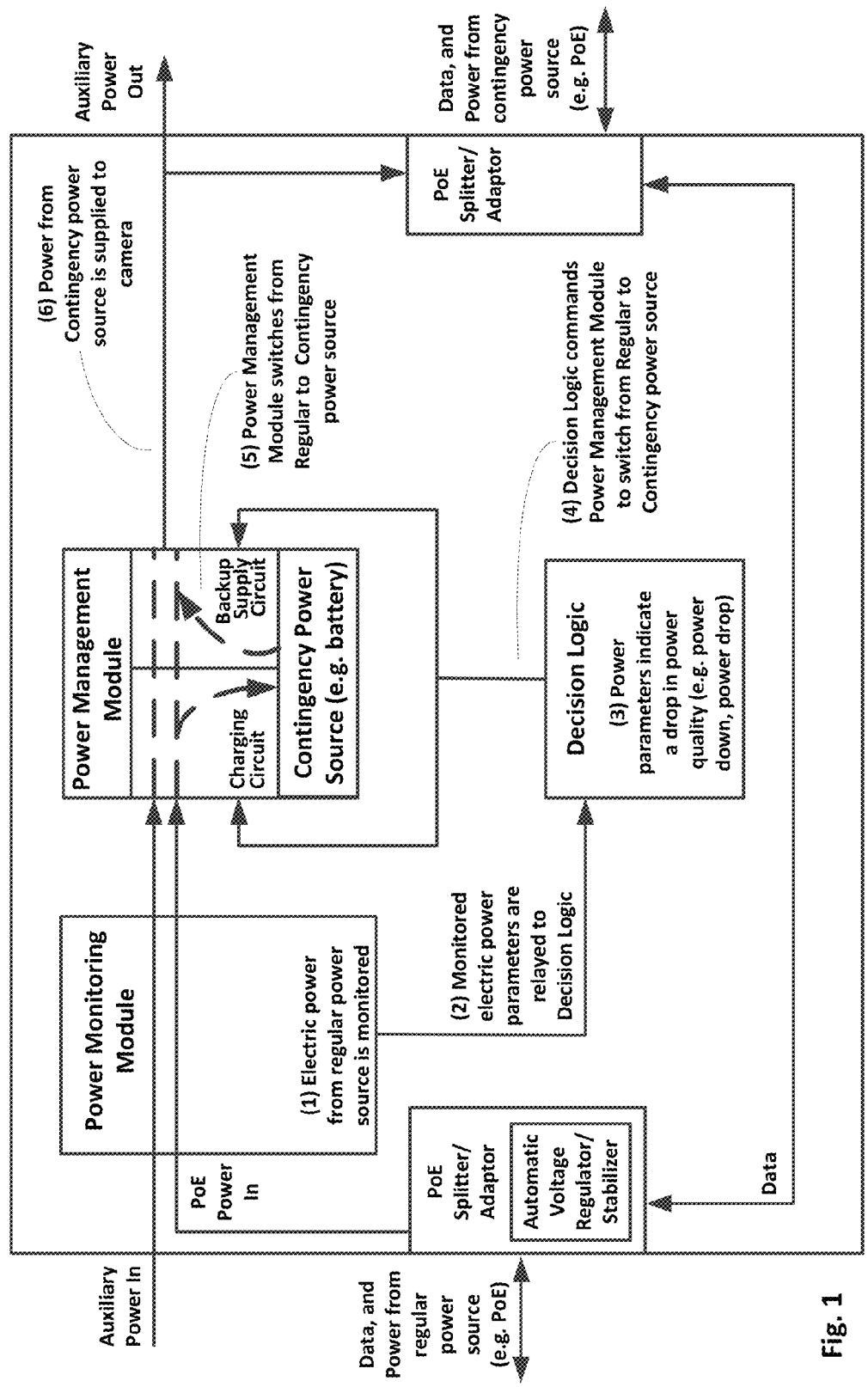
FIG. 1 is a block diagram showing the main modules and operation steps of an exemplary system for facilitating network camera backup, in accordance with some embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The processes and displays presented herein, although generally directed to the backup of cameras and/or IP cameras, are not inherently related to any particular camera or electric equipment type. Various general-purpose systems and/or apparatuses may be used in accordance with the teachings herein, or it may prove convenient to construct a more specialized apparatus, to facilitate the backup of any type of PoE, or non-PoE, edge device, known today or to be devised in the future. The desired structure for a variety of these systems will appear from the description below. Such edge devices may include, but are in no way limited to: IP cameras, Wifi APs, IP phones, ADSL and cable modems, Media converters, IP PBXs, Access control controllers and ID readers, IP intercoms; and/or any edge device, known today or to be devised in the future.

In the following discussions utilization of the term Power over Ethernet (PoE) may refer to any constellation\standard that includes a combination of power supply and data propagation, through the same cable (e.g. different wires of same cable are separately used for power or data) and/or the same wire(s) (e.g. power and data signals run on same wire and are separated at sink based on amplitude or frequency). Teachings of the present invention may be likewise utilized as part of any installation between Power Sourcing Equipment (PSE) and one or more Power Devices (PD) regardless of how the data and power are delivered between them, this may also include, but is not limited to, new standards such as Power Over HDBaseT (POH) (e.g. IEEE 802.3at standard) that may enable the transfer of DC power in conjunction with data signals over a single Ethernet cable to a distance of up to 100 meters (m), and/or any other standard, known today or to be devised in the future.

General

The present invention is a system, apparatus, and device for facilitating network camera backup and methods of operation thereof. According to some embodiments of the present invention, an apparatus/device for facilitating network camera backup may be positioned between a networked camera (e.g. in or next to camera housing) and the network side of the camera to/from which data is communicated and from which regular electric power is supplied to the camera (e.g. data and power as PoE).

According to some embodiments of the present invention, the apparatus/device for facilitating network camera backup may comprise: a First PoE Splitter/Adaptor, on the network side of the apparatus/device, for separating the PoE provided data and power connections; a Power Monitoring Module for monitoring the quality and extracting electric parameters of electric power supplied by a regular power source; a Decision Logic for determining, based on the extracted electric parameters, if a drop in power quality has occurred and issuing a respective power source switching command; a Power Management Module, including a Charging Circuit for charging of, and a Backup Supply Circuit for switching from the regular power source to, a Contingency Power Source, in response to a power source switching command from the decision logic; and/or a Second PoE Splitter/Adaptor, on the camera side of the apparatus/device, for merging the separated data connection and the power connection of the contingency power source and relaying as PoE to the camera.

According to some embodiments of the present invention, the apparatus/device for facilitating network camera backup may be implemented as an independent unit that may be positioned within the housing of a network camera, and/or outside the housing, and possibly in substantial proximity to it, on the network side of the camera. According to some embodiments, the apparatus/device for facilitating network camera backup may be implemented as an integral, or partially integral, part of a network camera such that at least some of the components of the apparatus are integrated and/or embedded into camera circuit boards (e.g. main circuit board) also handling other camera operation related functionalities. Any of the features described hereinafter, or parts thereof, may be at least partially implemented by either: a network camera comprising integrated network camera backup functionalities and/or a standalone network camera backup apparatus functionally associated with a network camera.

Embodiments of the present invention may be implemented in various infrastructure, power, communication, and cabling environments. Accordingly, a variety of media converters and/or adapters, for switching between different physical medias and/or converting analog signals/data to digital format and vice versa, may be used as part of many connection configurations of an apparatus in accordance with the present invention. According to some exemplary embodiments, a media converter may convert signal(s) travelling over fiber-optic, Coax, RJ45 and/or any other type of data carrying medium (e.g. cables) known today or to be devised in the future, to Ethernet compatible medium that may also be used for carrying power (e.g. PoE). An apparatus/device for facilitating network camera backup may, accordingly, comprise a media converter on its network side to convert network data signals of other medium types to over Ethernet signals; and/or a media converter on its camera side to convert camera data signals of other medium types to over Ethernet signals.

According to some embodiments of the present invention, the system/apparatus/device may comprise, or be functionally associated with an AVR/S (Automatic Voltage Regulator/Stabilizer) for protecting against power surges, spikes and/or noise. An AVR/S may be implemented as part of the invention system/apparatus/device in order to protect the camera, camera recorded data, and/or other system components, from lightning or power-grid originating, potentially damaging, power scenarios.

In FIG. 1 there are shown, in accordance with some embodiments of the present invention, the main modules and operation steps of an exemplary system/apparatus for facilitating network camera backup, in accordance with some embodiments of the present invention.

System on Chip

According to some embodiments of the present invention a system, apparatus and device for facilitating network edge device backup and continuous operation may be adapted to switch, based on the extracted electric parameters, between a PoE based power source and at least two additional contingency power sources such as, but not limited to, one or more auxiliary power source(s) and/or one or more internal/external, possibly rechargeable, battery or battery packs.

According to some embodiments of the present invention, a system, apparatus, device, and/or method for facilitating network edge device backup and continuous operation, including at least some of the system configurations and process flows described hereinafter, may be implemented on an electronic circuit as a System on Chip (SoC), wherein system logic and/or functionalities are integrated onto a circuit. According to some embodiments, a System on Chip (SoC) for facilitating network edge device backup and continuous operation may include: (1) an Integrated Circuit Power Supply Channel from a PoE line, and (2) Integrated Circuit Power Supply Channel(s) from at least one additional contingency/backup power source(s). The Power Supply Channels may be simultaneously feeding the circuit; each channel may be routed through one or more respective (3) Diode(s), Diodes equivalents and/or Active Switches.

The Power Supply Channels may be coupled, joined and/or merged such that The Power Supply Channel supplying the highest voltage (e.g. PoE) determines the electrical flow in the circuit, and thus supplies the power to the edge device. The diode(s), Diodes equivalent or Active Switches, on the Power Supply Channels (e.g. auxiliary, battery) providing lower voltages, and/or non-supplying/turned-off/disconnected channels, prevent power of the highest voltage power sources from travelling uplink towards their source(s) and/or other uplink circuit or channel components. A failure or power drop in the highest voltage power source may thus trigger the engagement of the second highest voltage power source; a failure or power drop in the second highest voltage power source may trigger the engagement of the third highest voltage power source; and the process may repeat. Upon reengagement of a power source of higher voltage than the currently operating source, it may 'take over' and return to control the circuit flow and provide power to the edge device(s).

According to some embodiments, any power channel may be selectively chosen (i.e. even when it is not the one with the highest voltage) by utilizing active switches (e.g. Field Effect Transistors [FET]) as power routing devices. According to some embodiments, the decision of which channel to activate may be executed by the SoC based on the parameters sensed in some or all of the different power channels (e.g. Voltage, Current, Temperature etc.).

According to some embodiments, a System on Chip (SoC) for facilitating network edge device backup and continuous operation may further include: (4) one or more Buck Converters, or any voltage step down converters, that may reduce the voltage of the DC supply to the circuit from higher voltage sources, and/or convert the main voltage of a given power source down to that needed by power consuming subcomponents of the SoC and/or associated edge device(s); and/or (5) one or more Boost Converters, or any voltage step up converters with an output voltage greater than its input voltage, that may increase the voltage of the DC supply to the circuit from lower voltage sources.

According to some embodiments, a System on Chip (SoC) for facilitating network edge device backup and continuous operation may further include: (6) Protection circuits such as, but not limited to, inrush, overheating, over voltage, and/or over current. According to some embodiments, the SoC system may further include, (7) PoE front end devices such as, but not limited to, Power sourcing Equipment (PSE) controller(s), Active\Passive diode bridge(s), and/or PoE end devices such as, but not limited to, Powered Device (PD) controllers.

According to some embodiments of the present invention, the condition of power supply to the power supply channels of the SoC may be monitored using a logical condition/threshold/rule-set enforced by a Decision Circuit integrated into the SoC and electrically associated with its power supply channels.

According to some embodiments of the present invention, a System on Chip (SoC) for facilitating network edge device backup and continuous operation may further include: (8) A Battery Charger for charging the rechargeable battery, or battery packs, power source(s). According to some embodiments, the rechargeable battery may be external, and/or integrated in the SoC. According to some embodiments, the battery(ies) and thus the charger may be a Lead-acid charger, a Nickel-cadmium charger, a Lithium-ion polymer charger, and/or any other charger type known today or to be devised in the future. According to some embodiments, the charger may be a universal charger that may support the charging of multiple types of rechargeable batteries.

According to some embodiments of the present invention, a System on Chip (SoC) for facilitating network edge device backup and continuous operation may further include: (9) One or more PoE Injectors, for "injecting" DC Power from one or more of the contingency/backup sources to a cable (e.g. CAT5) in order to power remote equipment and/or edge device(s) using Power over Ethernet cabling, possibly over the same cable infrastructure used under regular (e.g. PoE) power supply conditions.

Figure 20A:
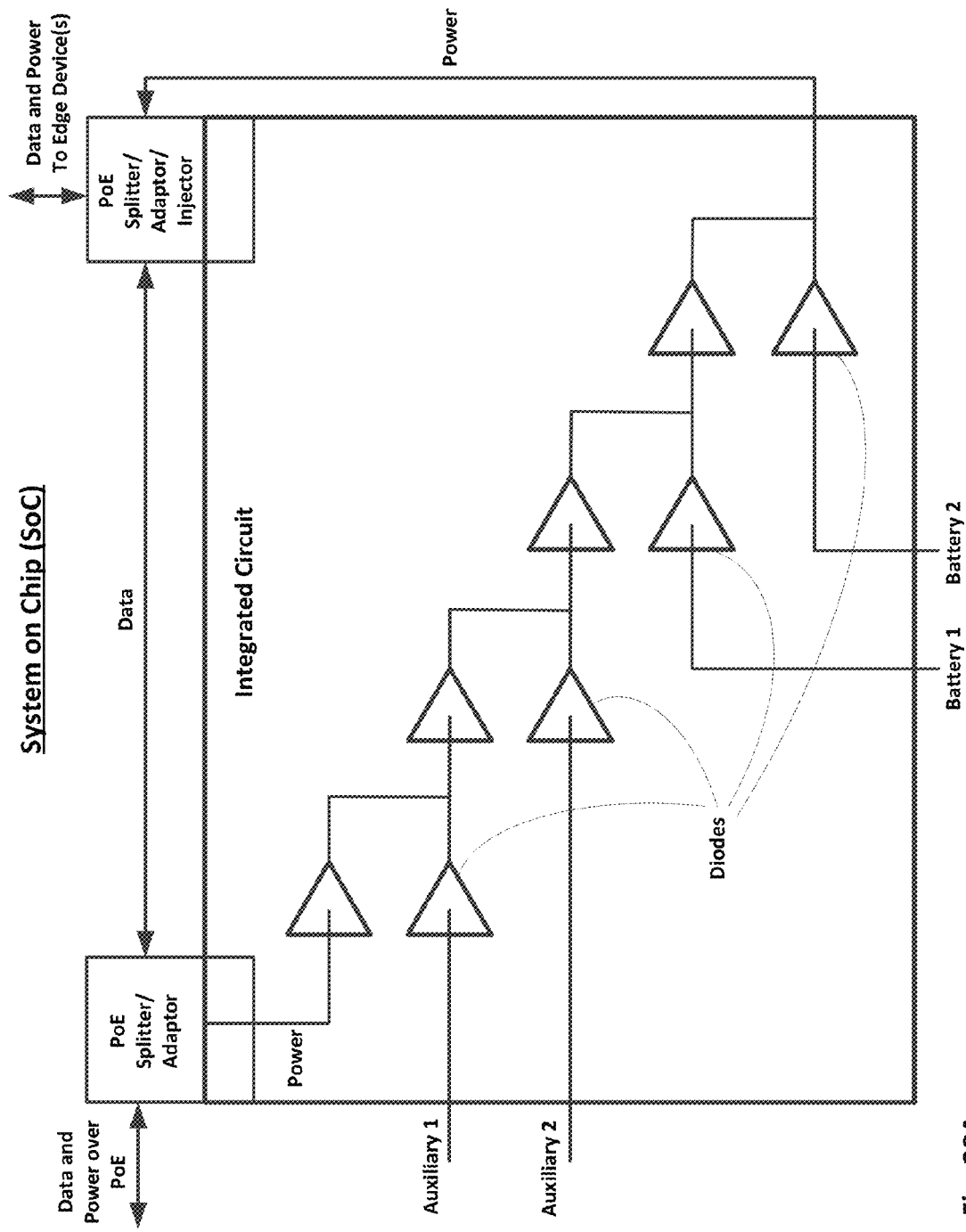
FIG. 20A is a block diagram showing diode layout of an exemplary simplified structure of a System on Chip (SoC) for facilitating network edge device backup and continuous operation, in accordance with some embodiments of the present invention.

In FIG. 20A there is shown, in accordance with some embodiments of the present invention, a block diagram showing a diode layout of an exemplary configuration of a System on Chip (SoC) for facilitating network edge device backup and continuous operation.

Figure 20B:
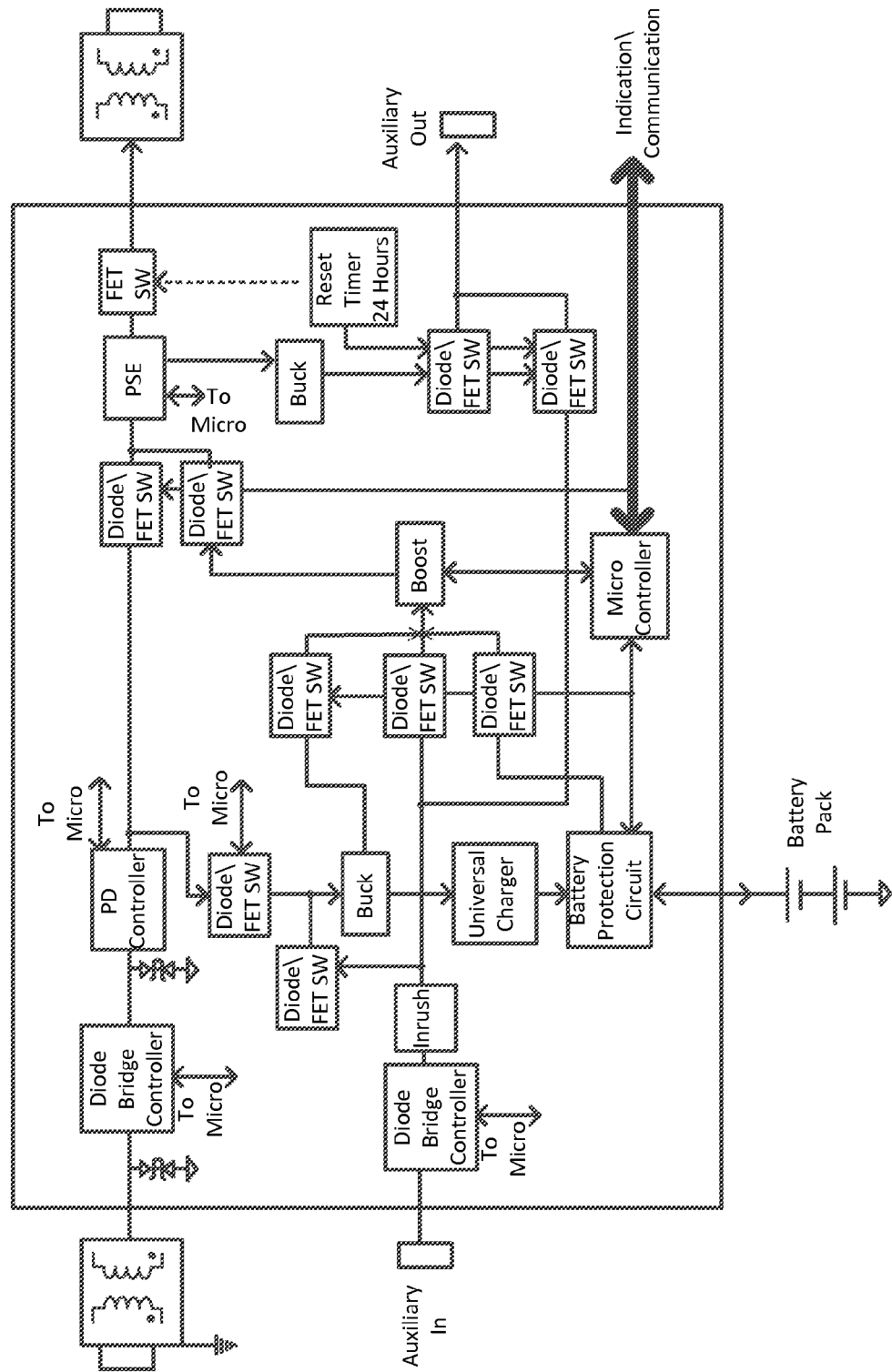
FIG. 20B is a block diagram showing the main modules, components, and diodes of an exemplary scheme of a System on Chip (SoC) for facilitating network edge device backup and continuous operation, in accordance with some embodiments of the present invention.

In FIG. 20B there is shown, in accordance with some embodiments of the present invention, a block diagram showing the main modules, components, and diodes of an exemplary scheme of a System on Chip (SoC) for facilitating network edge device backup and continuous operation. The Exemplary SoC shown is fed by three power sources: a PoE power line, an Auxiliary power source (e.g. $1^{st}$ backup), and a battery pack (e.g. $2^{nd}$ backup); and further comprises: A PSE for negotiating the amount of power required or available; Boost and Buck circuits for outputting voltage magnitudes that are either greater than or lesser than the input voltage; Field Effect Transistors for controlling the conductivity level of certain circuit channels; Inrush Protection Circuit for protecting SoC components from power surges by limiting the voltage supplied by either blocking or by shorting to ground any unwanted voltages above a safe/wanted threshold; Battery Protection Circuit for protecting the Battery Pack power source from power surges from other power sources feeding the SoC; Reset Timer for periodically resetting power source selection scheme to its original definitions/configuration; Diode Bridge Controllers for converting alternating current (AC) from power sources inputs into direct current (DC) output; Diodes (or FETs) for controlling the current flow in the SoC based on power source availability; and a Micro Controller for controlling the described SoC components in concert.

According to some embodiments of the present invention, under certain power supply conditions, and/or as part of specific contingency source(s) power supply, a power allocation priority scheme—for one or more of the system supported/powered edge devices, and/or one or more components thereof—may be triggered and utilized by the system. For example, as part of switching to a contingency battery power source which may supply limited power and/or supply power for only a limited time, a corresponding priority power scheme may be triggered by the Decision Logic. The triggered power scheme may halt power supply to some of the supported edge devices (e.g. less 'important'/'prone' surveillance cameras) and/or component(s) or processes thereof (e.g. move surveillance cameras from constant power supply to intermittent supply, and/or only supply to camera's microphone and not to video recorder).

Figure 21:
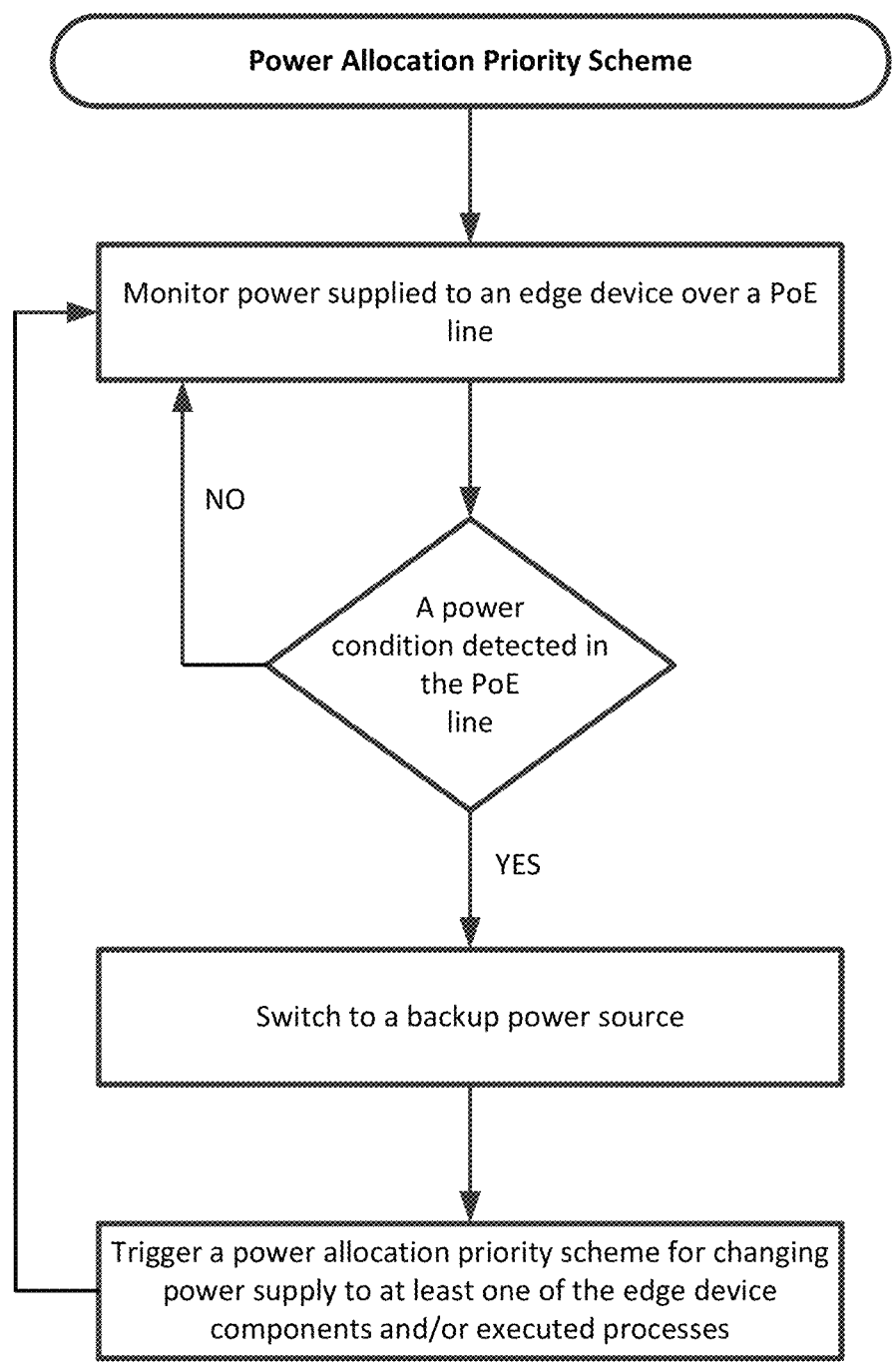
FIG. 21 is a flowchart showing the main steps taken as part of an exemplary process for triggering and managing a PoE powered edge devices power allocation priority scheme, in accordance with some embodiments of the present invention.

In FIG. 21 there is shown a flowchart of the main steps taken as part of an exemplary process for managing a PoE powered edge device and triggering a power allocation priority scheme for the edge device, in accordance with some embodiments of the present invention.

Contingency Power and Battery Recharge

According to some embodiments of the present invention, the contingency power source may be a battery; according to some embodiments, the contingency power source may be rechargeable battery. The apparatus/device may comprise: a Contingency Power Source Charging Module for using external and/or internal electric power from the regular power source (i.e. while available)—PoE, and/or Auxiliary Power—for charging the rechargeable battery contingency power source. According to some embodiments, the Power Management Module may switch between the regular power source (e.g. PoE line) and two or more contingency power sources, in response to a power source switching command from the decision logic. For example, the Power Management Module may initially switch to an auxiliary backup power source—in response to a drop in power quality in the regular power source, and may later switch to a rechargeable battery backup power source—in response to a drop in power quality in the auxiliary backup power source.

Figure 2:
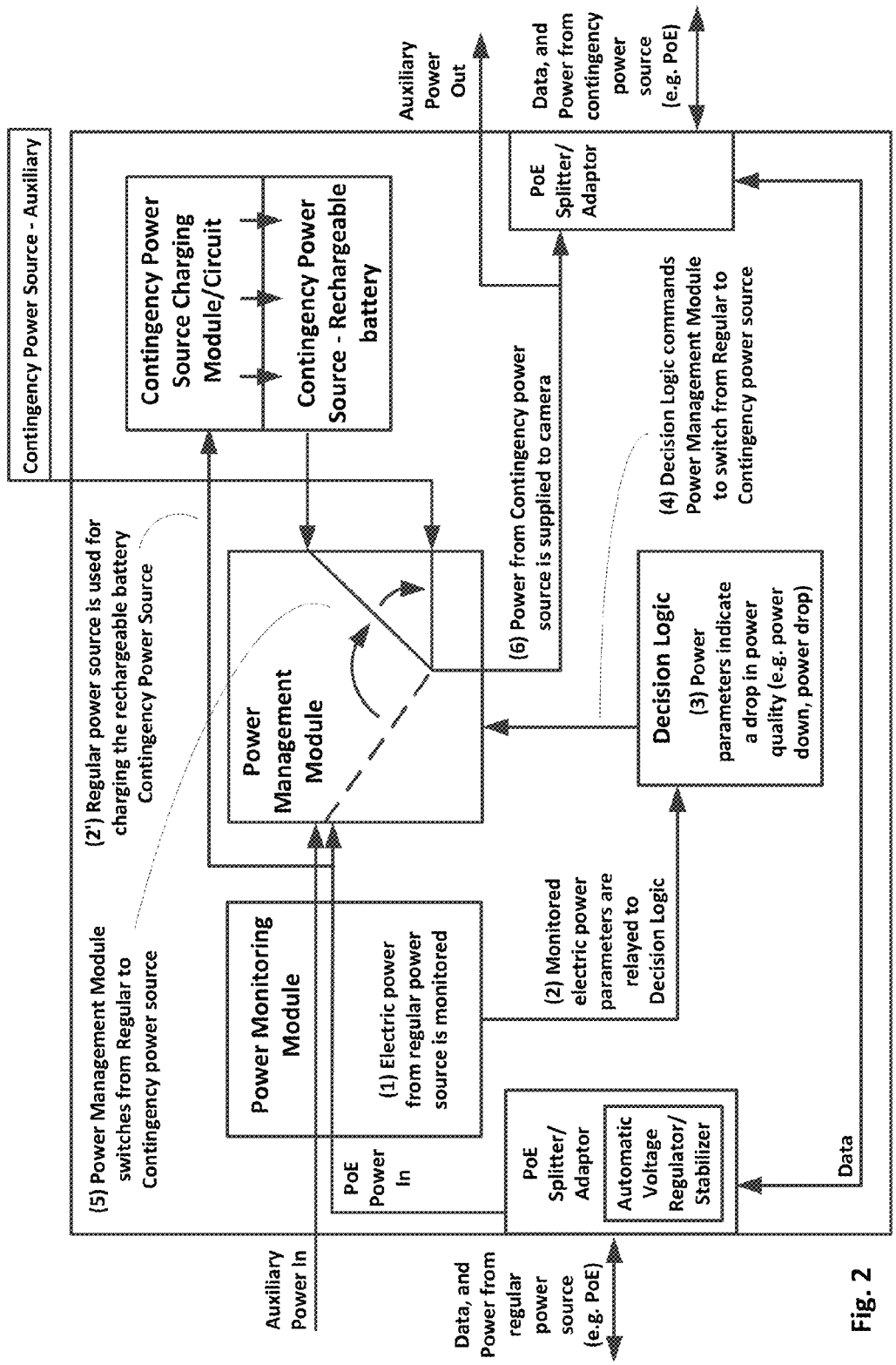
FIG. 2 is a block diagram showing the main modules and operation steps of an exemplary system for facilitating network camera backup, comprising a rechargeable battery as its contingency powers source, in accordance with some embodiments of the present invention.

In FIG. 2 there are shown, in accordance with some embodiments of the present invention, the main modules and operation steps of an exemplary system/apparatus for facilitating network camera backup, comprising a rechargeable battery as its contingency powers source and a power management module for switching between a regular power source and two contingency power sources.

Local Storage

According to some embodiments of the present invention, the decision logic, upon determining based on the extracted electric parameters that a drop in power quality has occurred, may issue a respective data storage switching command to a Data Communication and Storage Management Module that in response may switch from the regular storage destination/sink (e.g. remote) to a Local Storage Module (e.g. an SD card). According to some embodiments, an Ethernet Replacement (e.g. IP mirror substitute) may be used as a substitute for the network destination/sink (e.g. an IP address) to which the camera regularly (i.e. under good power quality conditions) relays its data.

It is hereby made clear that any local/contingency/secondary storage module of the present invention, may be implemented using: magnetic, optical, read-only memories (ROMs), random access memories (RAMs), electrically programmable read-only memories (EPROMs), electrically erasable and programmable read only memories (EEPROMs), Flash memory, and/or any other type of media suitable for storing electronic instructions, and capable of being coupled to a computer system bus.

Figure 3:
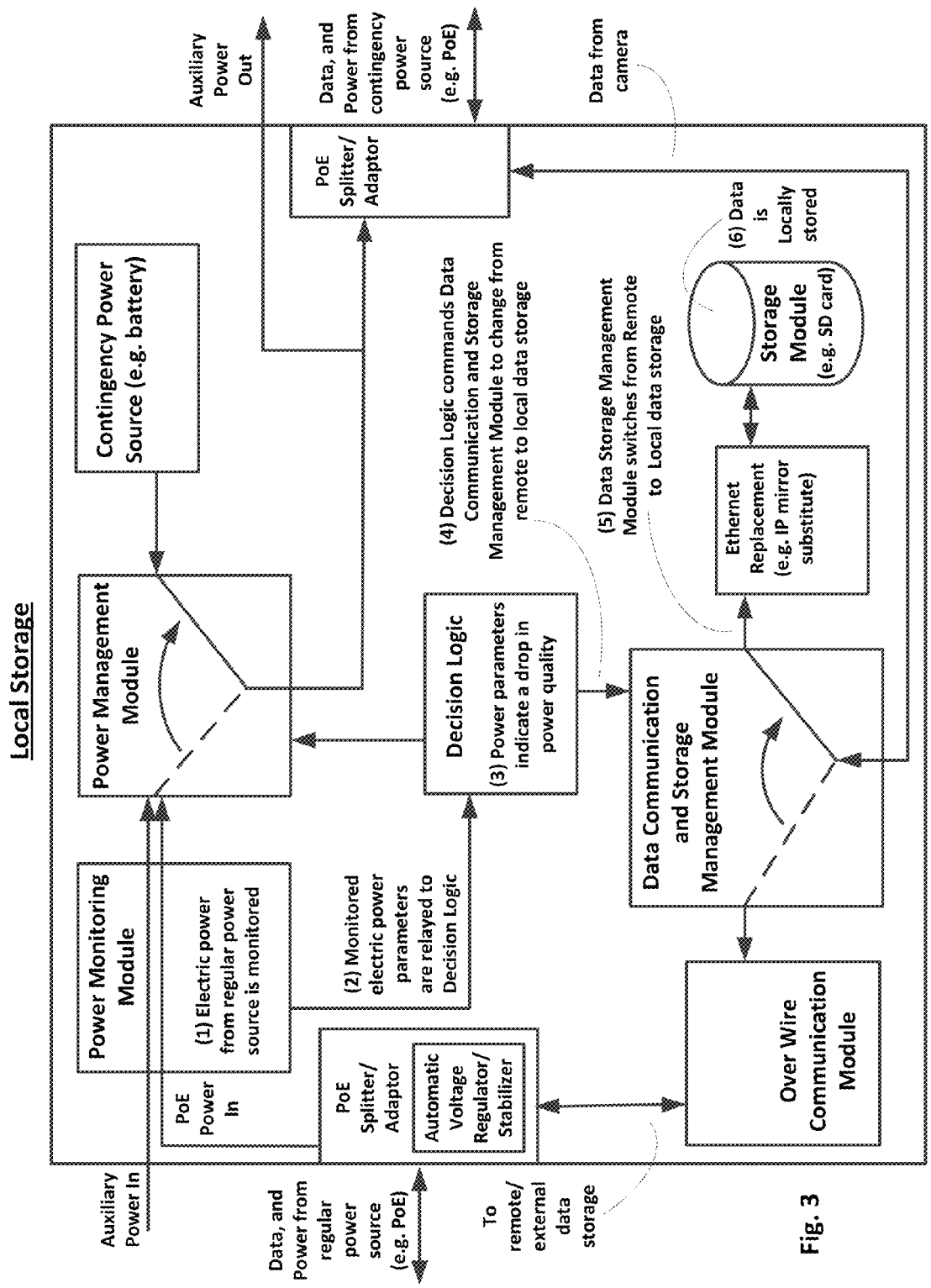
FIG. 3 is a block diagram showing the main modules and operation steps of an exemplary system for facilitating network camera backup, comprising a local data storage module, in accordance with some embodiments of the present invention.

In FIG. 3 there are shown, in accordance with some embodiments of the present invention, the main modules and operation steps of an exemplary system/apparatus for facilitating network camera backup, comprising a local data storage module.

Wireless Storage Access

According to some embodiments of the present invention, the decision logic, upon determining based on the extracted electric parameters that a drop in power quality has occurred, may issue a respective data storage switching command to the Data Communication and Storage Management Module that in response may switch from the regular storage destination/sink (e.g. remote) to a Networked Storage Module accessed through a Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 4:
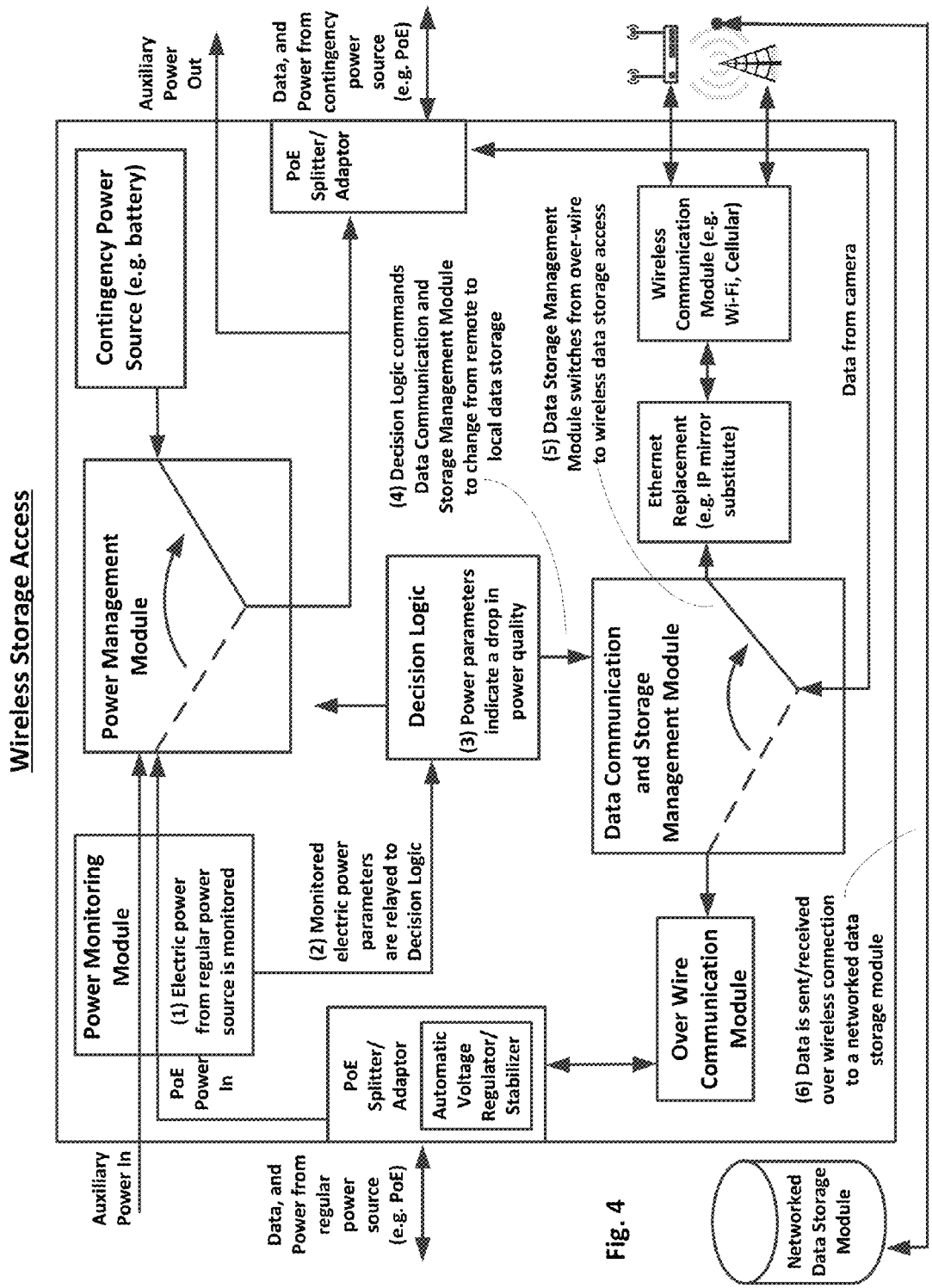
FIG. 4 is a block diagram showing the main modules and operation steps of an exemplary system for facilitating network camera backup, comprising a wirelessly accessed network data storage module, in accordance with some embodiments of the present invention.

In FIG. 4 there are shown, in accordance with some embodiments of the present invention, the main modules and operation steps of an exemplary system/apparatus for facilitating network camera backup, comprising a wirelessly accessed network data storage module.

Combined Wireless Storage Access and Local Storage

According to some embodiments of the present invention, the Data Communication and Storage Management Module, switching from the regular storage destination/sink (e.g. remote), may include and combine between a Networked Storage Module accessed through a Wireless Communication Module (e.g. Wi-Fi, Cellular) and a Local Storage Module (e.g. an SD card). According to some embodiments, combinations between the Networked Storage Module accessed through a Wireless Communication Module (e.g. Wi-Fi, Cellular) and the Local Storage Module (e.g. an SD card) may include: storing data to both destinations, storing certain data or data types to one and other data or data type to the other destination, selecting and storing to only one of the destinations based on their availability, selecting and storing to only one of the destinations based on power quality drop (e.g. based on characteristics of the drop in power quality that occurred and the respective data storage switching command received by the Data Communication and Storage Management Module), and/or any other combination (e.g. system resources based, time based, system environment based).

Figure 19:
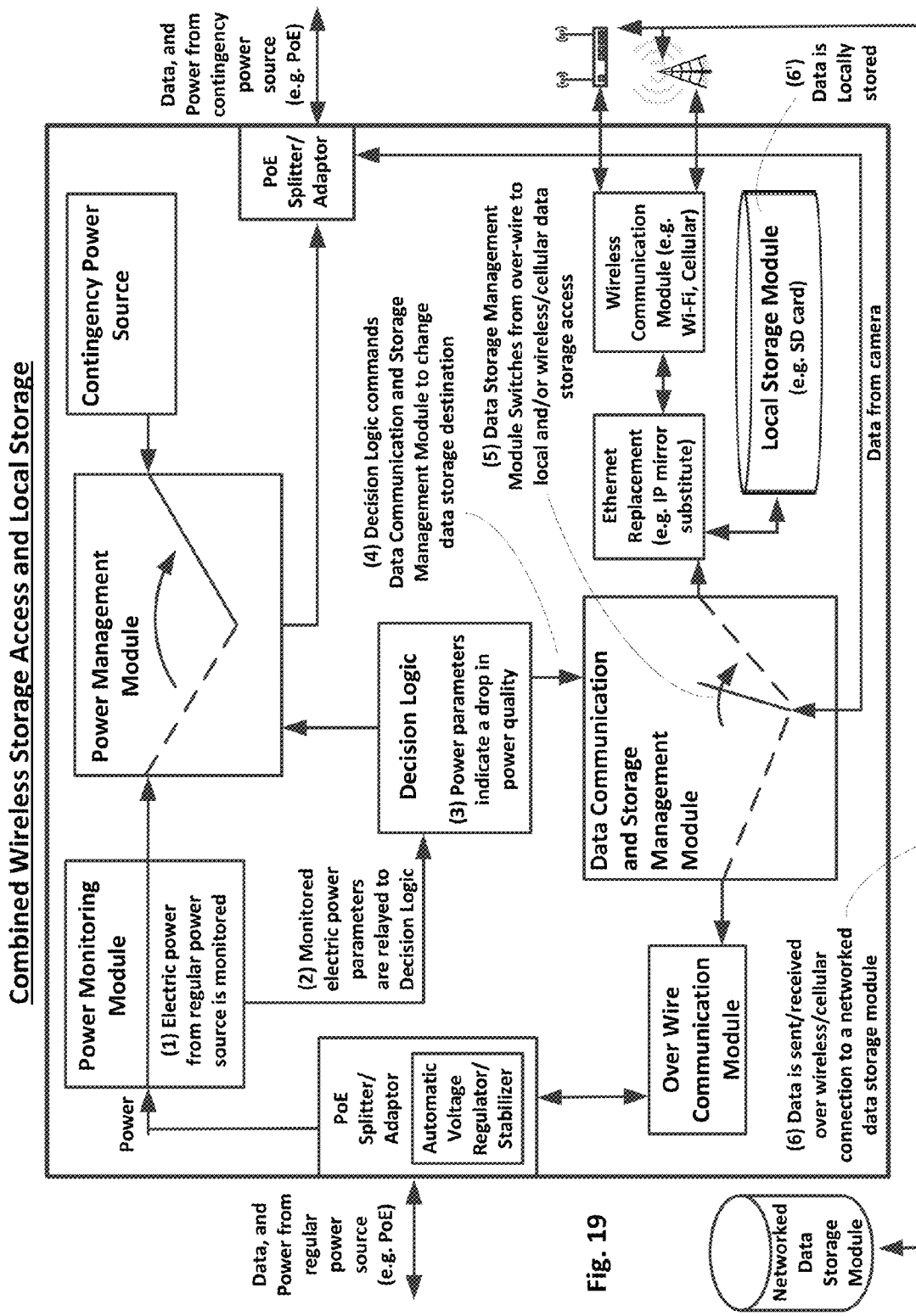
FIG. 19 is a block diagram showing the main modules and components of an exemplary system configuration for facilitating combined wireless storage access and local storage, in accordance with some embodiments of the present invention.

In FIG. 19 there are shown, in accordance with some embodiments of the present invention, the main modules and operation steps of an exemplary system/apparatus for facilitating network camera backup, comprising a combination of a Networked Storage Module accessed through a Wireless Communication Module (e.g. Wi-Fi, Cellular) and a Local Storage Module.

Degraded Data Quality Storage

According to some embodiments of the present invention, a Storage Space Monitoring Module may intermittently check the remaining storage space available on the Local Storage Module, and relay remaining space indicative data to the Decision Logic. Upon the available space decreasing to/beyond a threshold value, the decision logic may issue a command to degrade the quality of stored camera data to the Data Communication and Storage Management Module, that in response may degrade the quality of camera data stored, thus allowing for a longer temporal record keeping period for a similar amount of available storage space.

Figure 5:
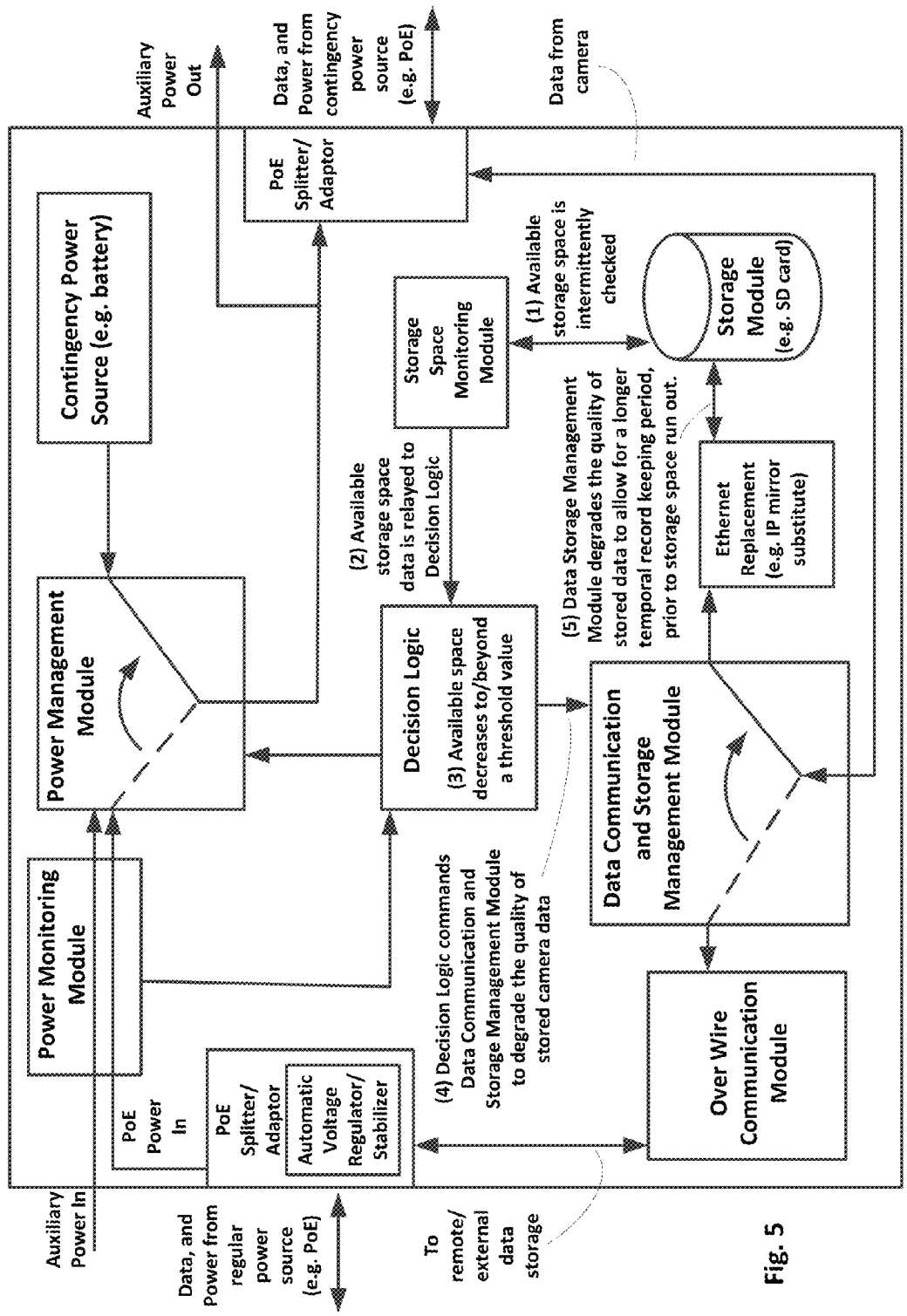
FIG. 5 is a block diagram showing the main modules and operation steps of an exemplary system for facilitating network camera backup, wherein the quality of stored data is degraded to allow for more data, or data of a longer camera operation time period, to be stored, in accordance with some embodiments of the present invention.

In FIG. 5 there are shown, in accordance with some embodiments of the present invention, the main modules and operation steps of an exemplary system/apparatus for facilitating network camera backup, wherein the quality of stored data is degraded to allow for more data, or data of a longer camera operation time period, to be stored.

Wireless Communication (Power)

According to some embodiments of the present invention, the decision logic, upon determining based on the extracted electric parameters that a drop in power quality has occurred, may issue a respective data storage switching command to the Data Communication and Storage Management Module that in response may switch from its regular over wire network connection, to using the Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 6:
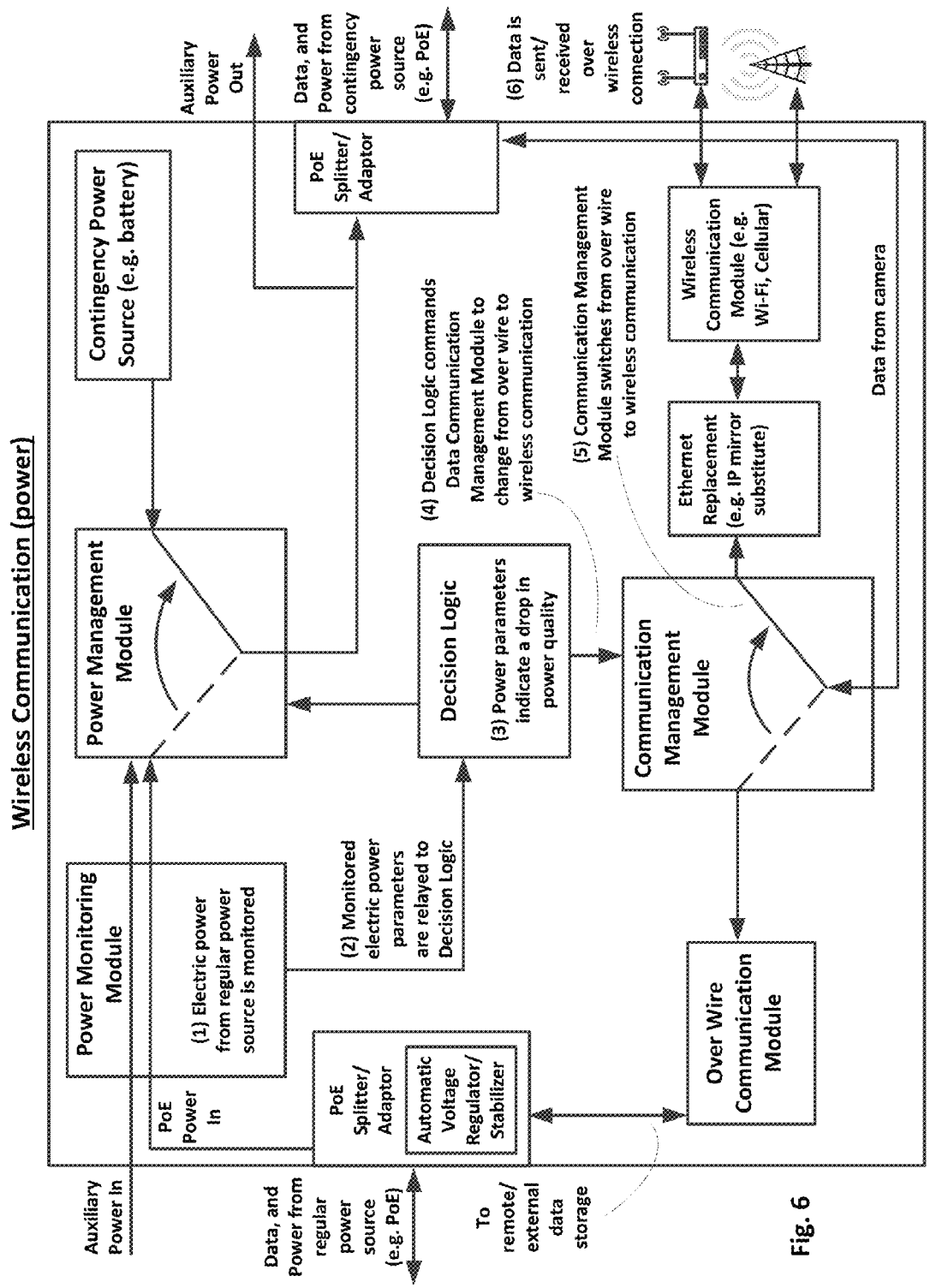
FIG. 6 is a block diagram showing the main modules and operation steps of an exemplary system for facilitating network camera backup, wherein the system switches from its regular (e.g. over wire) communication to wireless (e.g. Wi-Fi, cellular) communication as a result of a drop in power quality, in accordance with some embodiments of the present invention.

In FIG. 6 there are shown, in accordance with some embodiments of the present invention, the main modules and operation steps of an exemplary system/apparatus for facilitating network camera backup, wherein the system switches from its regular (e.g. over wire) communication to wireless (e.g. Wi-Fi, cellular) communication as a result of a drop in power quality.

Wireless Communication (network)

According to some embodiments of the present invention, a Network Monitoring Module may intermittently check the quality of the regular network connection. The decision logic, upon determining based on the extracted network connection parameters that the regular connection is down/bad, may issue a respective data storage switching command to the Data Communication and Storage Management Module that in response may switch from its regular over wire network connection (determined to be down/bad), to using the Wireless Communication Module (e.g. Wi-Fi, Cellular). According to some embodiments, the Ethernet Replacement (e.g. IP mirror substitute) may be used as a substitute for the network destination/sink (e.g. an IP address) to which the camera regularly (i.e. under good network connection quality conditions) relays its data.

Figure 7:
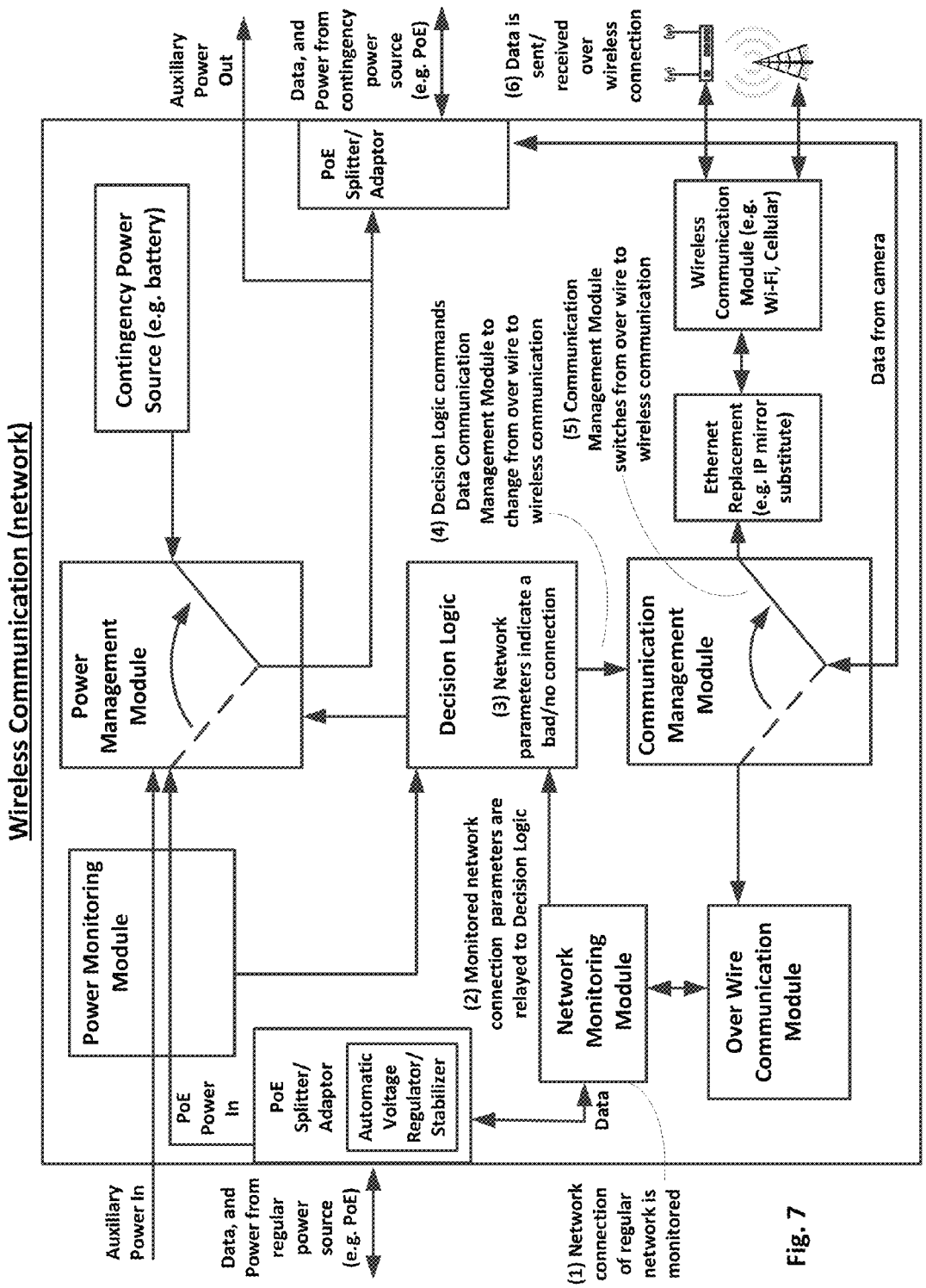
FIG. 7 is a block diagram showing the main modules and operation steps of an exemplary system for facilitating network camera backup, wherein the system switches from its regular (e.g. over wire) communication to wireless (e.g. Wi-Fi, cellular) communication as a result of a drop in the quality of its network connection, in accordance with some embodiments of the present invention.

In FIG. 7 there are shown, in accordance with some embodiments of the present invention, the main modules and operation steps of an exemplary system/apparatus for facilitating network camera backup, wherein the system switches from its regular (e.g. over wire) communication to wireless (e.g. Wi-Fi, cellular) communication as a result of a drop in the quality of its network connection.

Cellular Power Down Alert

According to some embodiments of the present invention, the decision logic, upon determining, based on the extracted electric parameters, that a drop in power quality has occurred, may issue a respective power quality drop notification/alert to the Data Communication and Storage Management Module that in response may use the Wireless Communication Module (e.g. Wi-Fi, Cellular) to send a cellular notification/alert of a drop in power quality to a Camera Administrator Device (e.g. a mobile communication device). According to some embodiments, the Ethernet Replacement (e.g. IP mirror substitute) may be used as a substitute for the network destination/sink (e.g. an IP address) to which the camera regularly (i.e. under good power quality conditions) relays its data.

Figure 8:
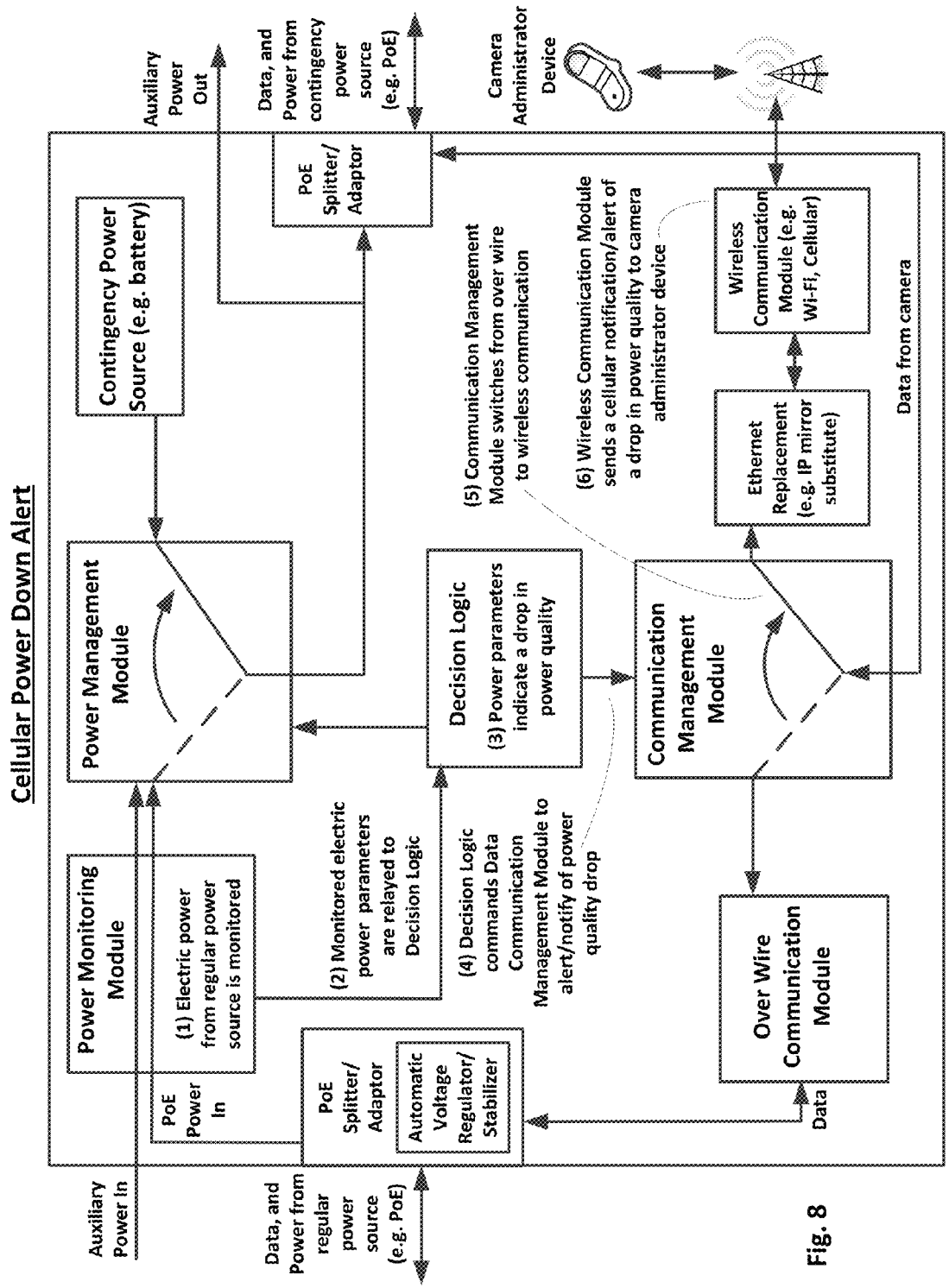
FIG. 8 is a block diagram showing the main modules and operation steps of an exemplary system for facilitating network camera backup, wherein a cellular notification/alert is sent to a mobile communication device of a network camera administrator as a result of a drop in power quality, in accordance with some embodiments of the present invention.

In FIG. 8 there are shown, in accordance with some embodiments of the present invention, the main modules and operation steps of an exemplary system/apparatus for facilitating network camera backup, wherein a cellular notification/alert is sent to a mobile communication device of a network camera administrator as a result of a drop in power quality.

Camera Power Consumption

According to some embodiments of the present invention, a Power Consumption Module may intermittently monitor the power consumption characteristics of the camera and extract power consumption related parameters. The decision logic, upon determining based on the extracted power consumption parameters that low, or no, power is being consumed by the camera, may issue a respective low/no camera power consumption notification/alert to the Data Communication and Storage Management Module that in response may use the Wireless Communication Module (e.g. Wi-Fi, Cellular) to send a cellular notification/alert of low/no camera power consumption to the Camera Administrator Device (e.g. a mobile communication device). According to some embodiments, the Ethernet Replacement (e.g. IP mirror substitute) may be used as a substitute for the network destination/sink (e.g. an IP address) to which the camera regularly (i.e. under good network connection quality conditions) relays its data.

Figure 9:
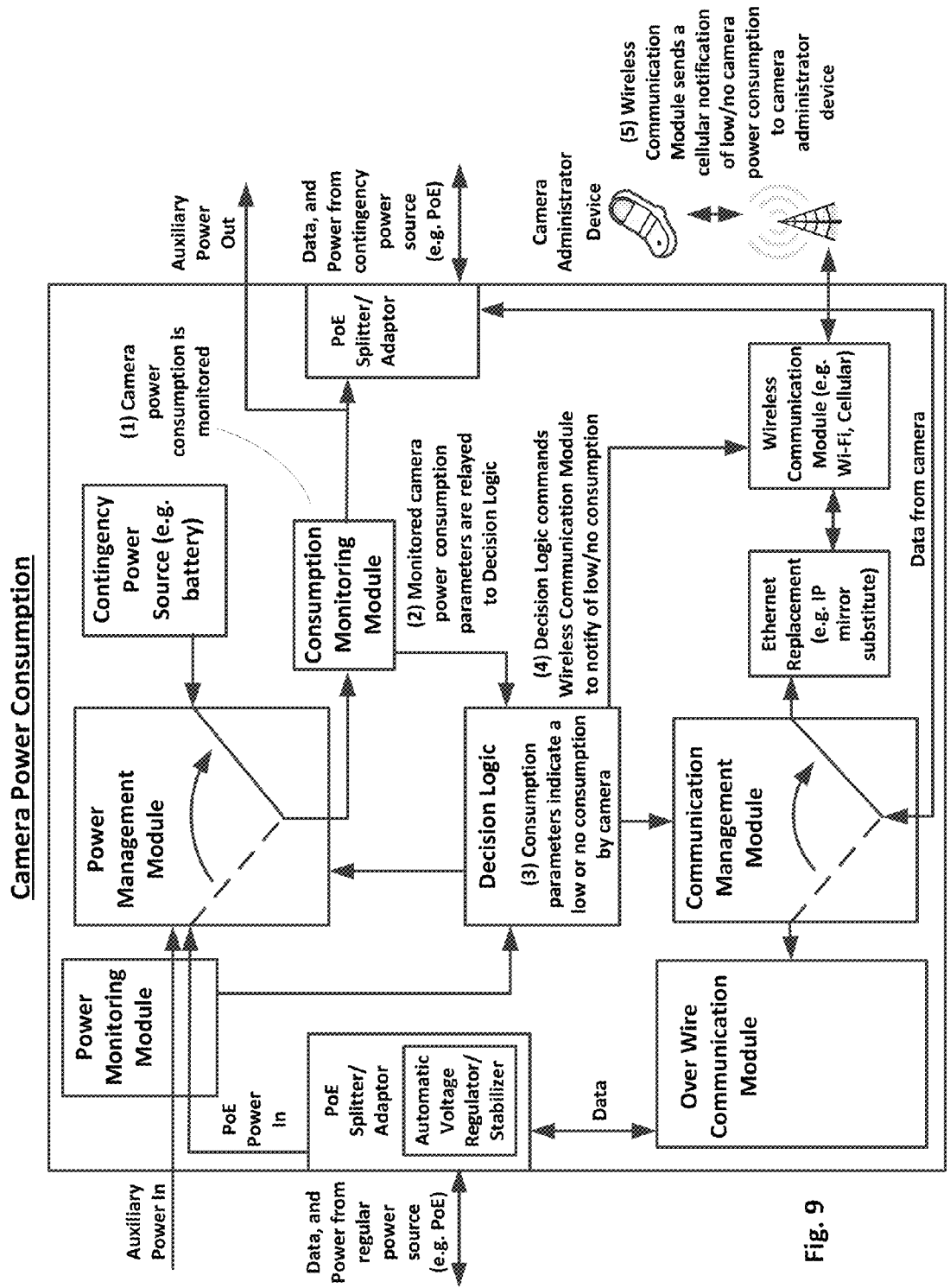
FIG. 9 is a block diagram showing the main modules and operation steps of an exemplary system for facilitating network camera backup, comprising a camera power consumption monitoring module wherein a cellular notification/alert is sent to a mobile communication device of a network camera administrator when no/low power is consumed by the camera, in accordance with some embodiments of the present invention.

In FIG. 9 there are shown, in accordance with some embodiments of the present invention, the main modules and operation steps of an exemplary system/apparatus for facilitating network camera backup, comprising a camera power consumption monitoring module wherein a cellular notification/alert is sent to a mobile communication device of a network camera administrator when no/low power is consumed by the camera.

Camera Power Down

According to some embodiments of the present invention, the Camera Administrator Device (e.g. a mobile communication device) may send a camera power down command through the Wireless Communication Module (e.g. upon receipt of a low/no camera power consumption from the Wireless Communication Module). Camera power down command may be relayed to the Decision Logic that may issue a corresponding command to the Power Management Module to temporarily halt/decrease power supply to the camera causing no/low power to temporarily be supplied to the camera.

Figure 10:
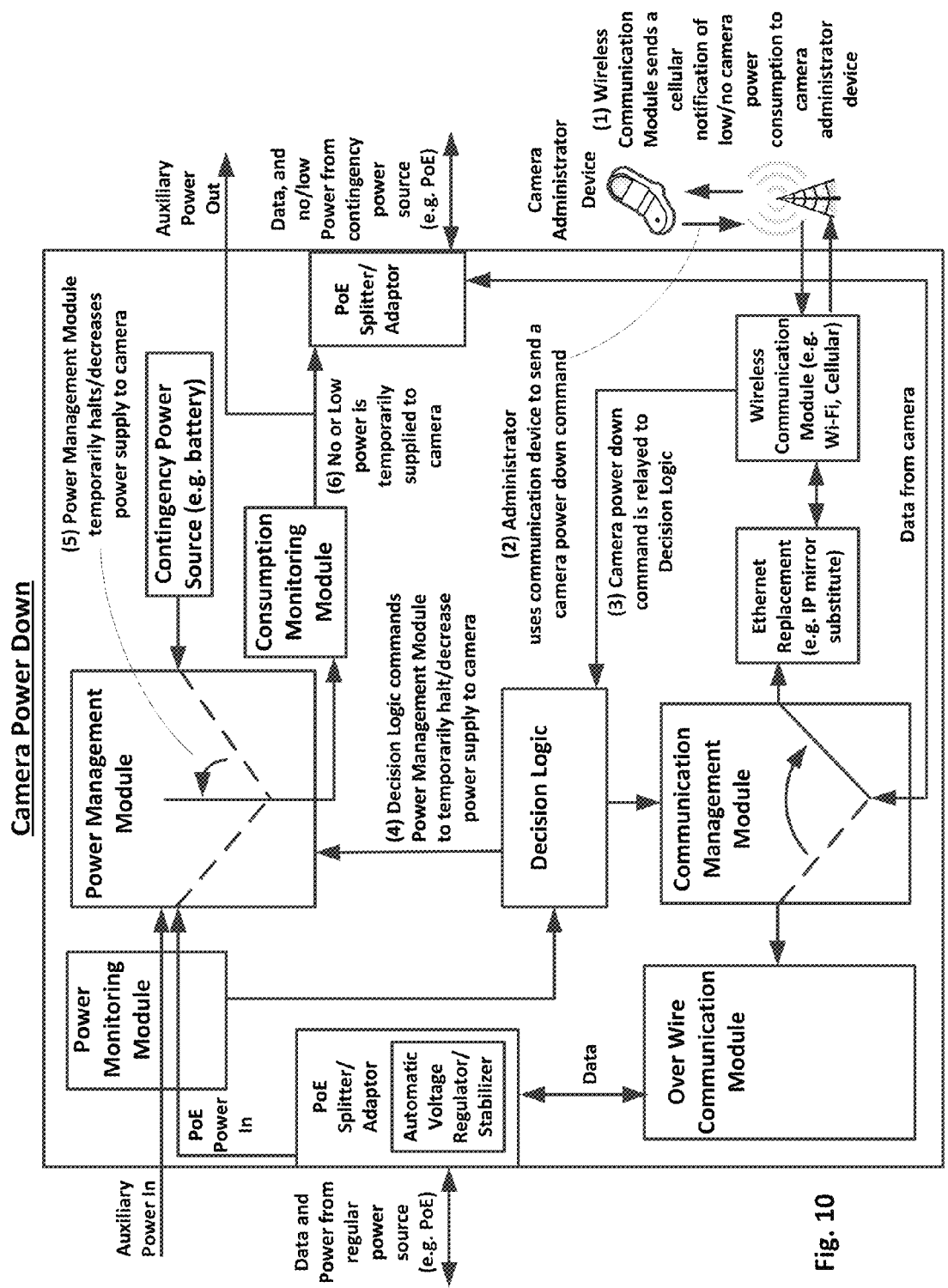
FIG. 10 is a block diagram showing the main modules and operation steps of an exemplary system for facilitating network camera backup, wherein power supply to the camera is temporarily halted/decreased as a result of a power down command from a mobile communication device of a network camera administrator, in accordance with some embodiments of the present invention.

In FIG. 10 there are shown, in accordance with some embodiments of the present invention, the main modules and operation steps of an exemplary system/apparatus for facilitating network camera backup, wherein power supply to the camera is temporarily halted/decreased as a result of a power down command from a mobile communication device of a network camera administrator.

Camera Auto Power Reset

According to some embodiments of the present invention, the Decision Logic, upon receiving camera consumption parameters indicative of low/no consumption by the camera and/or based on a temporal indication/triggering from/by a preset or dynamically-set timer, may automatically issue a corresponding command to the Power Management Module to reset/restart/boot the camera and/or temporarily halt/decrease power supply to it.

Figure 11:
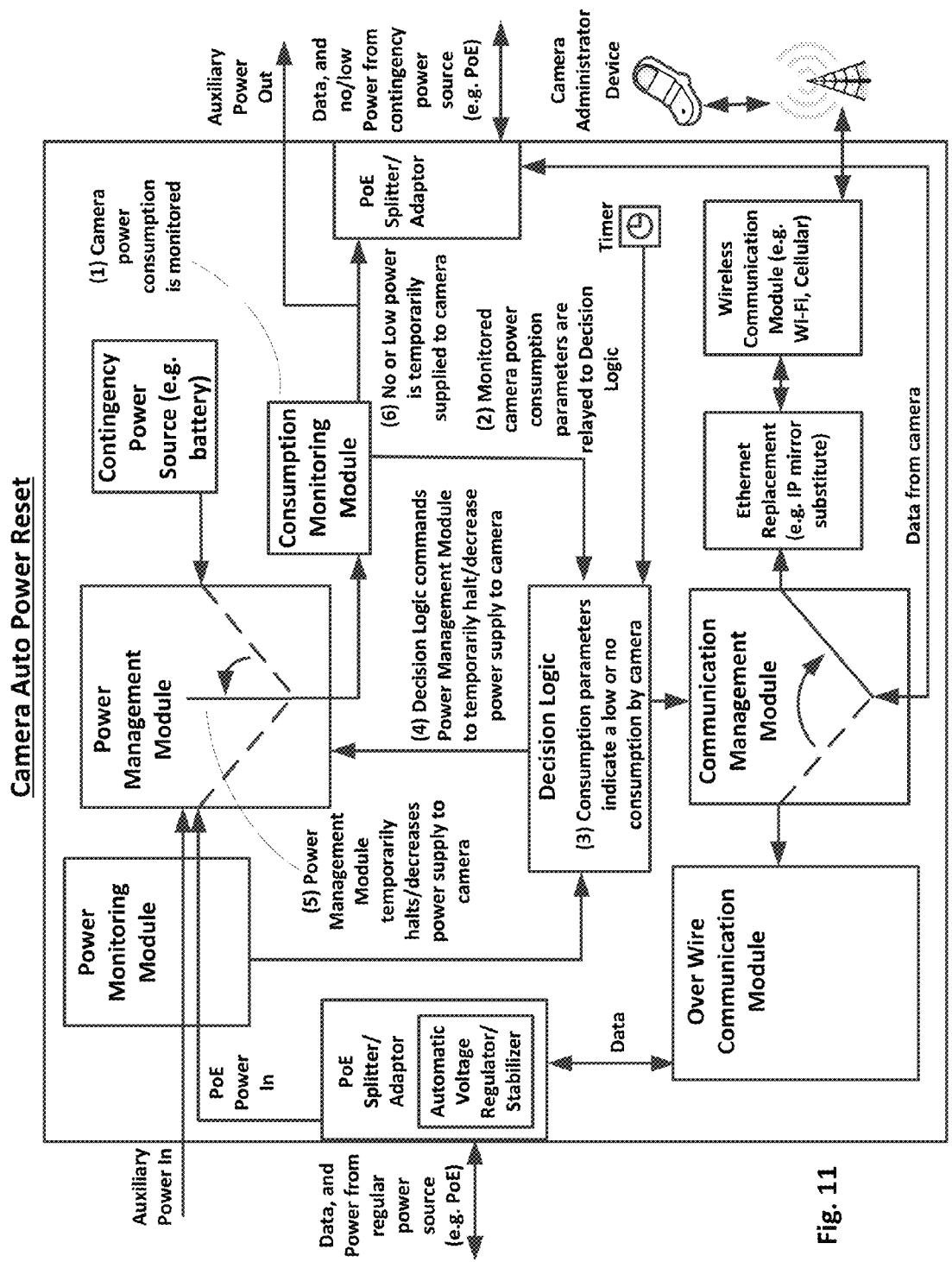
FIG. 11 is a block diagram showing the main modules and operation steps of an exemplary system for facilitating network camera backup, wherein power supply to the camera is automatically temporarily halted/decreased as a result of the camera consumption module parameters indicating low/no power consumption by the camera, in accordance with some embodiments of the present invention.

In FIG. 11 there are shown, in accordance with some embodiments of the present invention, the main modules and operation steps of an exemplary system/apparatus for facilitating network camera backup, wherein power supply to the camera is automatically temporarily halted/decreased as a result of the camera consumption module parameters indicating low/no power consumption by the camera.

Camera Video Parameters

According to some embodiments of the present invention, a Video Monitoring and Analysis Module may monitor the video data stream received from the camera. Video parameters (e.g. resolution, quality, focusing, field of view) may be extracted and relayed to the Decision Logic. The video parameters, possibly following to an initial processing stage, may be communicated to the Camera Administrator Device (e.g. a mobile communication device) through the Wireless Communication Module.

Figure 12:
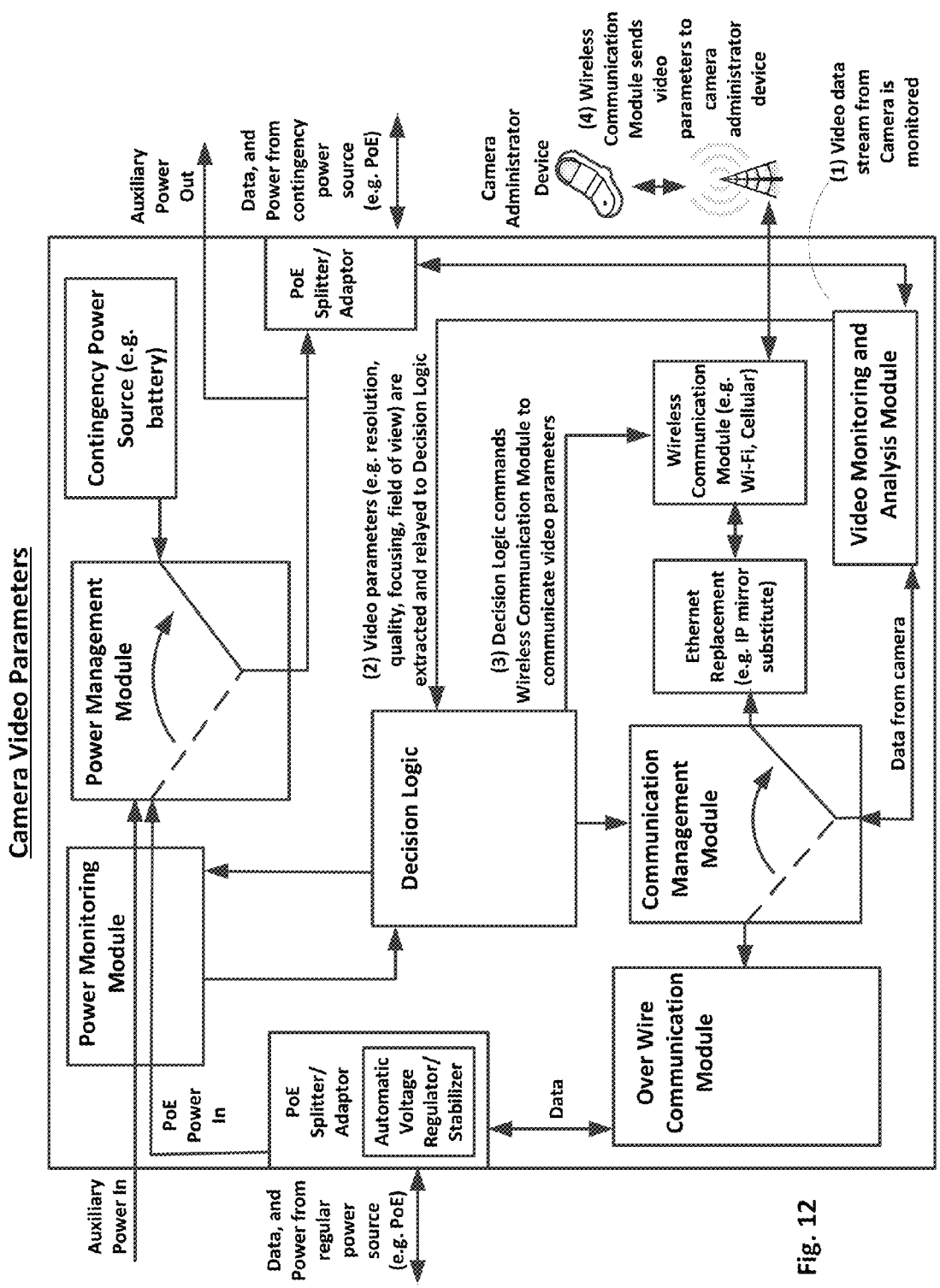
FIG. 12 is a block diagram showing the main modules and operation steps of an exemplary system for facilitating network camera backup, comprising a video monitoring and analysis module for extracting video parameters from a monitored video data stream of a camera, in accordance with some embodiments of the present invention.

In FIG. 12 there are shown, in accordance with some embodiments of the present invention, the main modules and operation steps of an exemplary system/apparatus for facilitating network camera backup, comprising a video monitoring and analysis module for extracting video parameters from a monitored video data stream of a camera.

Camera Control

According to some embodiments of the present invention, the Camera Administrator Device (e.g. a mobile communication device) may send camera control commands through the Wireless Communication Module (e.g. based on received video parameters data from the Wireless Communication Module). A Camera Control Module may receive the commands from the Decision Logic and relay them to the camera.

Figure 13:
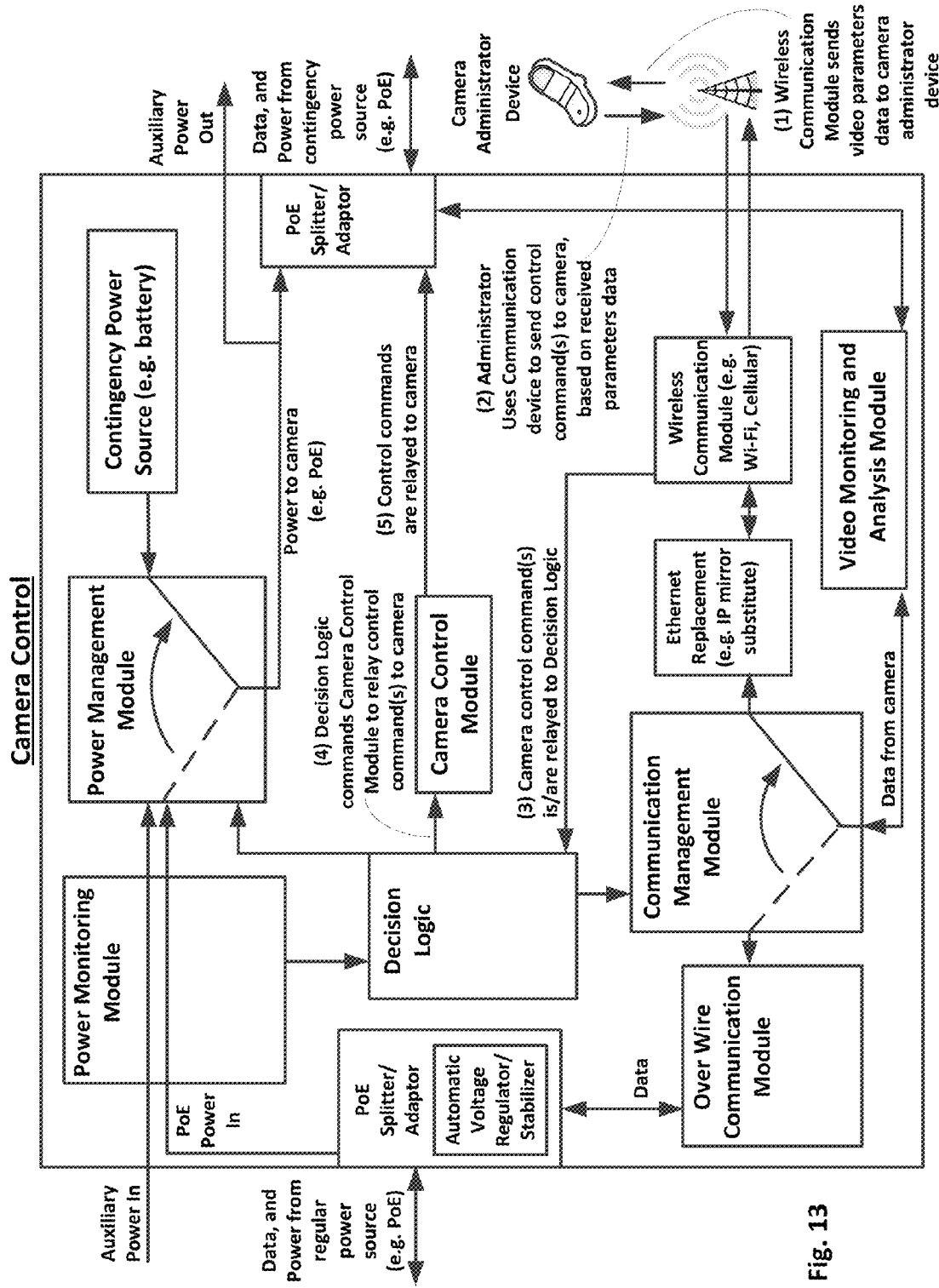
FIG. 13 is a block diagram showing the main modules and operation steps of an exemplary system for facilitating network camera backup, wherein 'video parameters data' based control commands from a mobile communication device of a network camera administrator are relayed to the camera, in accordance with some embodiments of the present invention.

In FIG. 13 there are shown, in accordance with some embodiments of the present invention, the main modules and operation steps of an exemplary system/apparatus for facilitating network camera backup, wherein 'video parameters data' based control commands from a mobile communication device of a network camera administrator are relayed to the camera.

Camera Profile Parameters

According to some embodiments of the present invention, video parameters (e.g. resolution, quality, focusing, field of view), extracted by the Video Monitoring and Analysis Module and relayed to the Decision Logic, may be compared by the Decision Logic to stored 'operation parameters profile' of the monitored camera. According to some embodiments, the Decision Logic may issue commands to the Camera Control Module, and from there to the camera, at least partially based on the results of the comparison to the 'operation parameters profile' of that camera.

Figure 14:
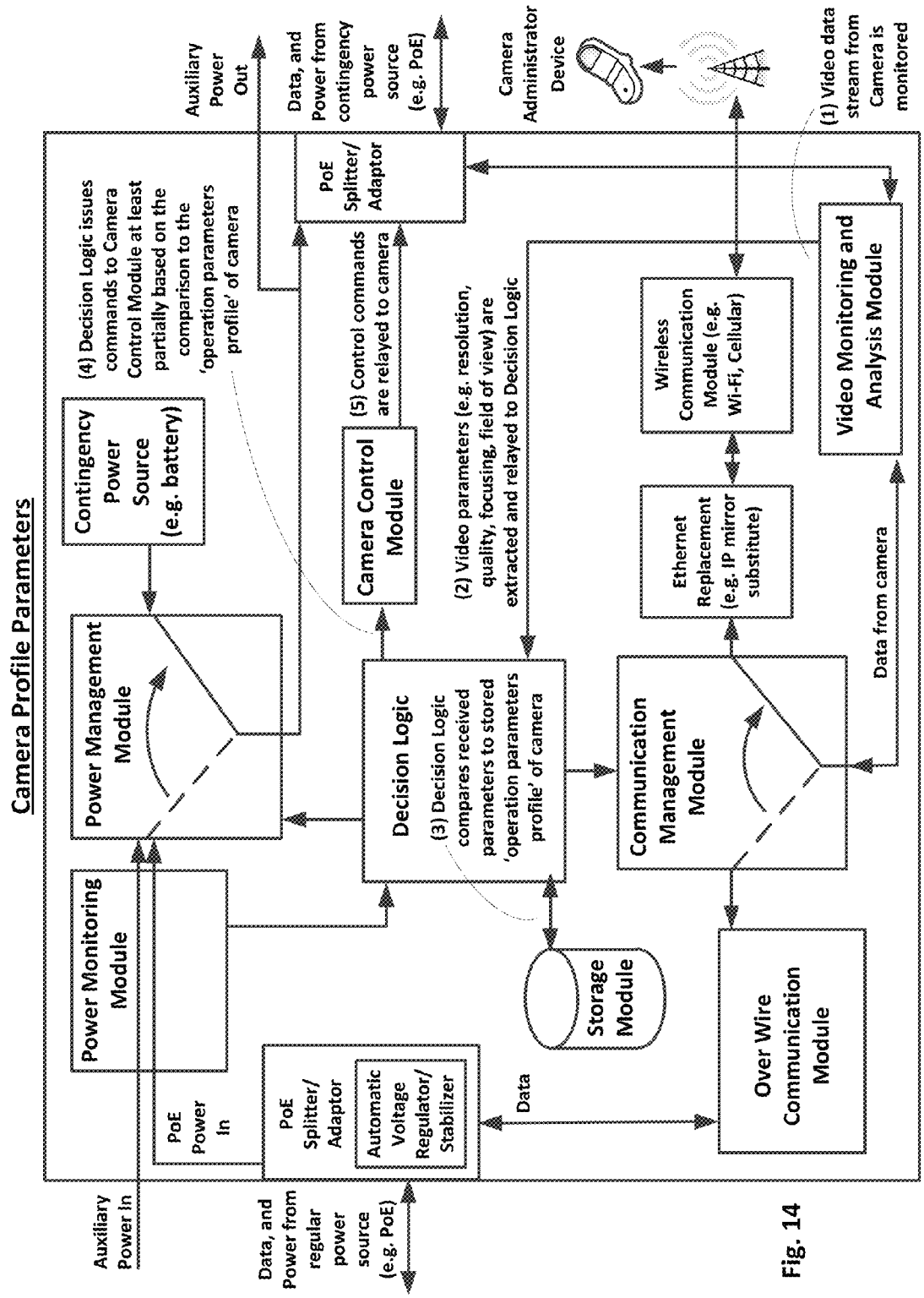
FIG. 14 is a block diagram showing the main modules and operation steps of an exemplary system for facilitating network camera backup, wherein control commands, based on a comparison between video parameters extracted from a monitored video data stream of a camera and an 'operation parameters profile' of that camera, are relayed to the camera, in accordance with some embodiments of the present invention.

In FIG. 14 there are shown, in accordance with some embodiments of the present invention, the main modules and operation steps of an exemplary system/apparatus for facilitating network camera backup, wherein control commands, based on a comparison between video parameters extracted from a monitored video data stream of a camera and an 'operation parameters profile' of that camera, are relayed to the camera.

Zero Power Drop

According to some embodiments of the present invention, power from a Contingency Power Source, such as a battery, may be repetitively boosted by a Battery Voltage Booster, while remaining in a standby mode (FIG. 15A). A drop in electric PoE input power may trigger an Electronic OR Logic Gate to switch from the PoE input power to the boosted Contingency Power Source (FIG. 15B). According to some embodiments, the power may be substantially instantly switched such that no, or only negligible, power drop is 'felt' by the power supplied camera and/or edge device.

In FIGS. 15A and 15B there are shown, in accordance with some embodiments of the present invention, the main modules and operation steps of an exemplary system/apparatus for facilitating network camera backup, wherein an Electronic OR logic gate switches between boosted battery power (15B) and PoE input power (15A).

Media Adaptors

Figure 16:
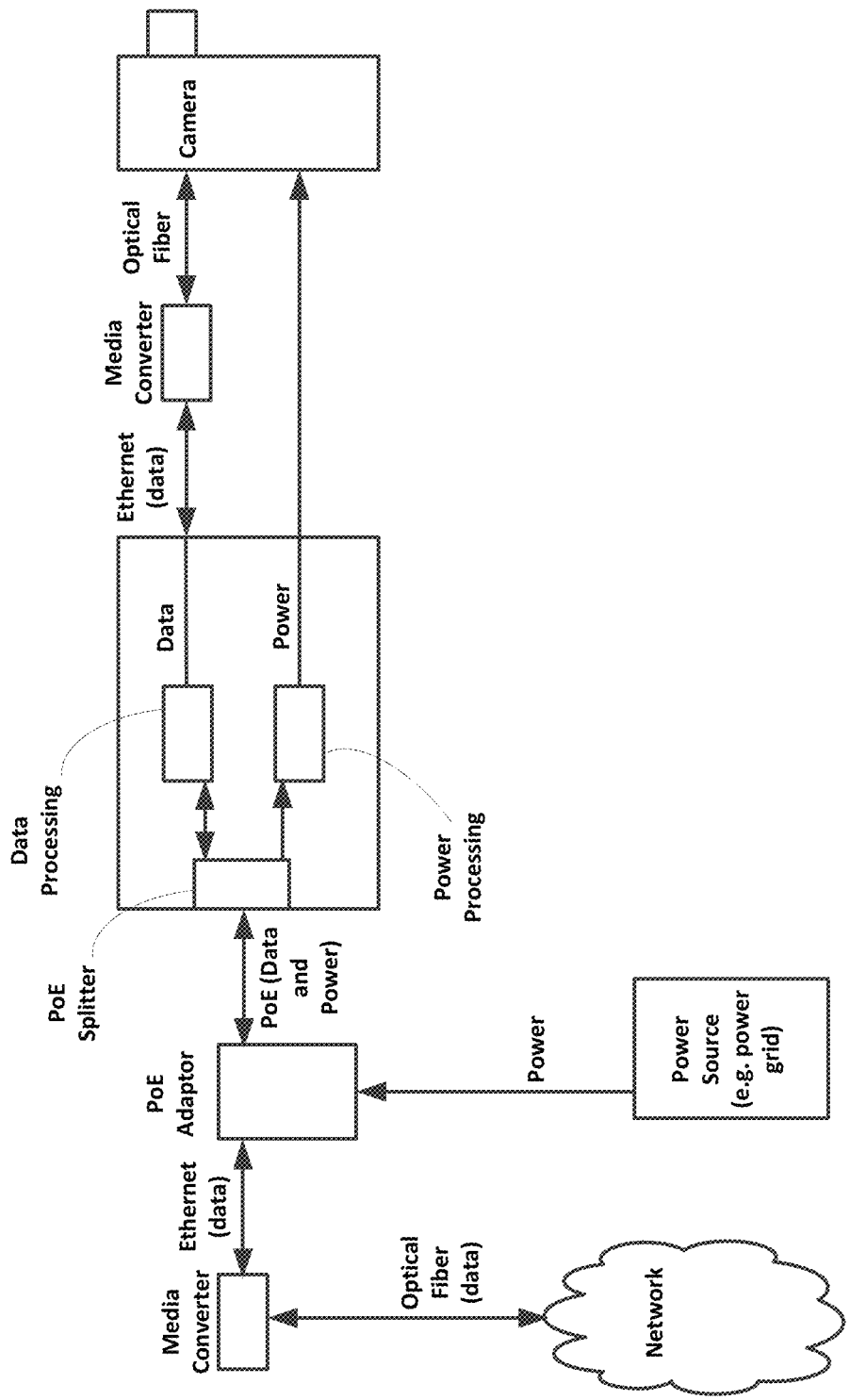
FIG. 16 is a block diagram showing the main modules and operation steps of an exemplary system for facilitating network camera backup, wherein media converters are used for switching system data communications from one cable medium to another, in accordance with some embodiments of the present invention.

In FIG. 16 there are shown, in accordance with some embodiments of the present invention, the main modules and operation steps of an exemplary system/apparatus for facilitating network camera backup, wherein media converters are used for switching system data communications from one cable medium to another.

Operation Flow

Figure 17:
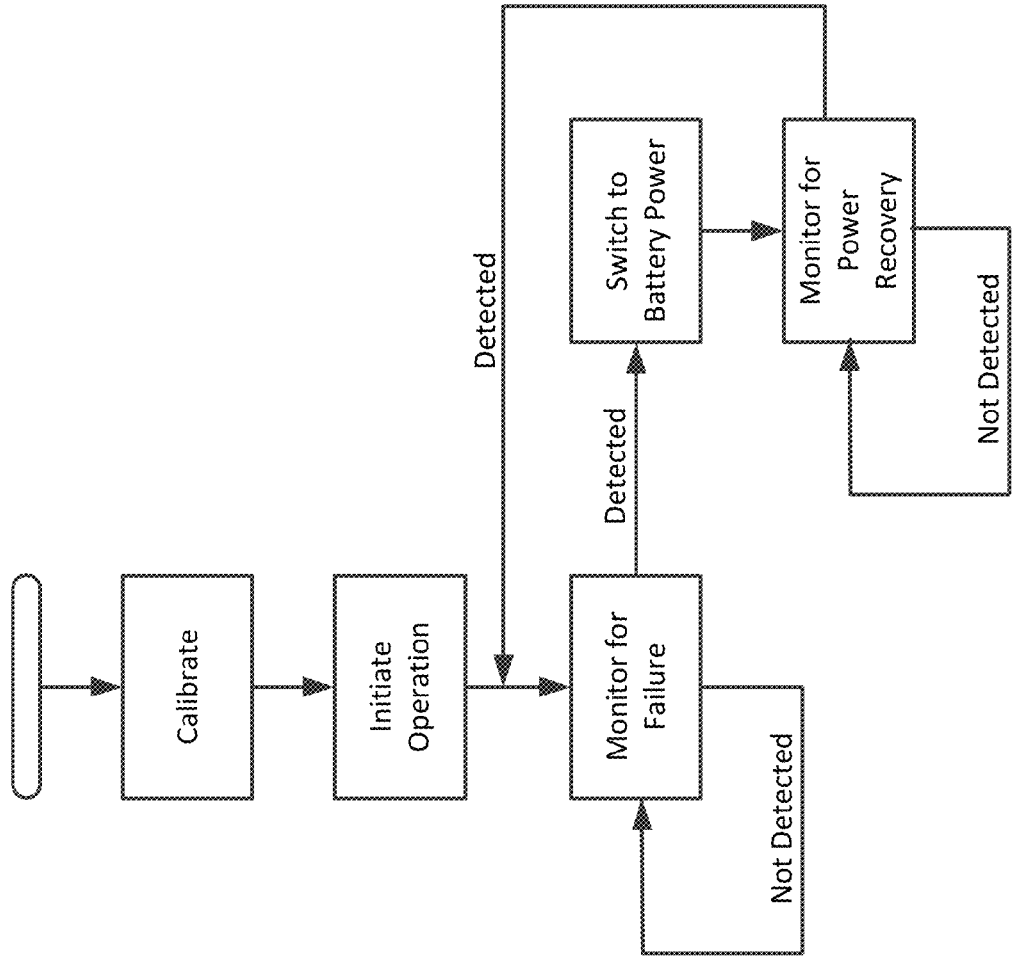
FIG. 17 is a flowchart showing the main operation steps of an exemplary apparatus for facilitating network camera backup, in accordance with some embodiments of the present invention.

In FIG. 17 there are shown, in accordance with some embodiments of the present invention, the main method operation steps executed by an exemplary system/apparatus for facilitating network camera backup.

System Configuration

Figure 18:
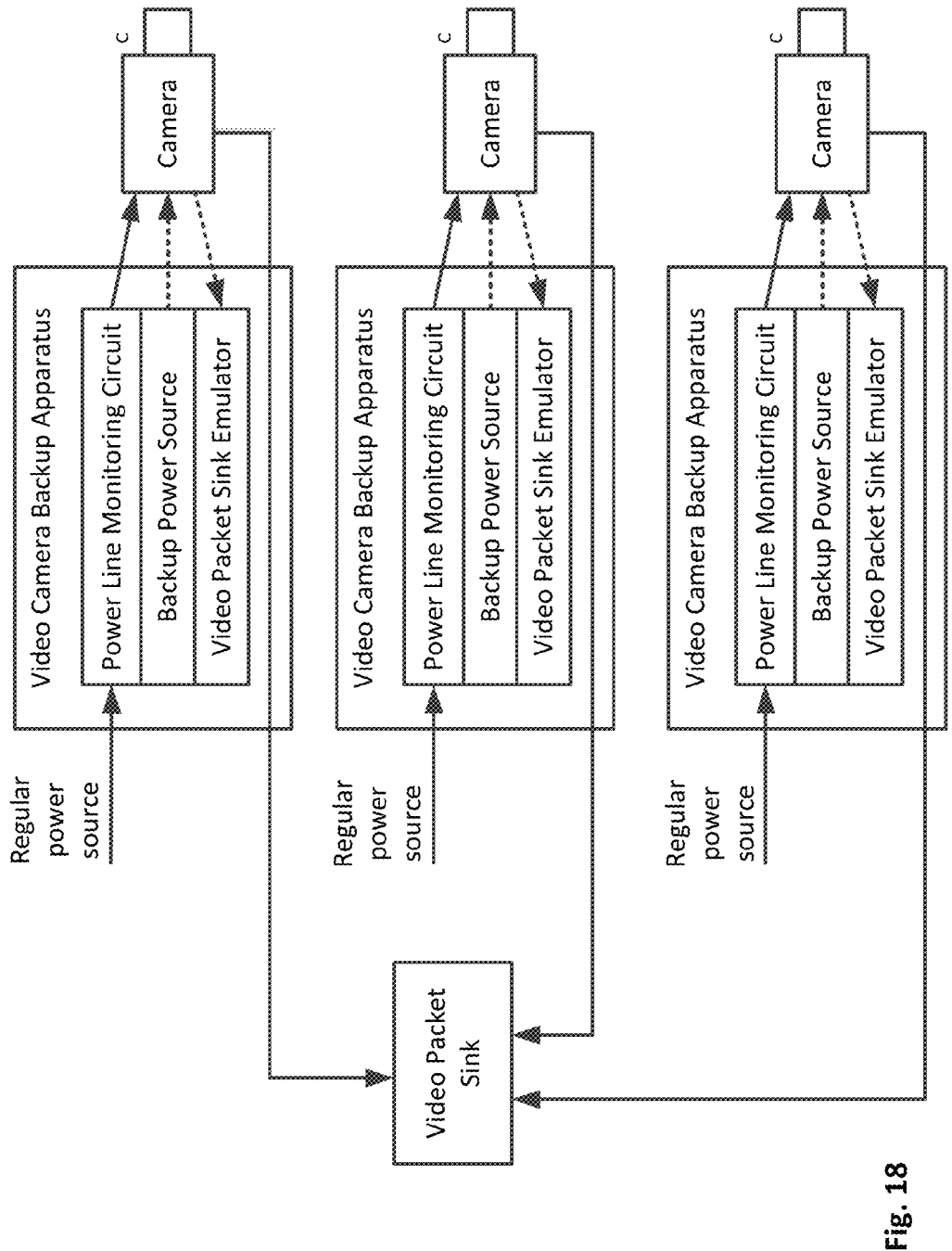
FIG. 18 is a block diagram showing the main modules and components of an exemplary system configuration for facilitating network camera backup, in accordance with some embodiments of the present invention.

In FIG. 18 there are shown, in accordance with some embodiments of the present invention, the main modules, components and relations of an exemplary system configuration for facilitating network camera backup.

According to some embodiments of the present invention, a video camera backup apparatus may comprise: a camera power-line monitoring circuit to detect an inoperable electrical power condition (IEPC) on the power-line; a backup power source to provide electrical power to the camera upon detection of an IEPC; and a video packet sink emulator adapted to emulate a video packet sink of the video camera upon detecting a connectivity fault between the video camera and the video packet sink.

According to some embodiments, an IEPC may include one or more conditions from the group consisting of: (1) power down, and/or (2) power drop. According to some embodiments, the power-line may be a Power over Ethernet (PoE) power-line. According to some embodiments, detection of power-loss on the PoE may indicate a connectivity fault between the video camera and the video packet sink. According to some embodiments, detection of power-loss on the PoE may trigger the video packet emulator to emulate the video packet sink. According to some embodiments the sink emulator may include a digital data storage medium. According to some embodiments, the sink emulator may include a connectivity fault detector. According to some embodiments, the backup power source may be a rechargeable battery, and power from the PoE line may be used to charge the rechargeable battery. According to some embodiments, an auxiliary backup power source may act as an alternative backup source to provide electrical power to the camera upon detection of an IEPC.

According to some embodiments of the present invention, a video monitoring system may comprise: one or more video cameras; a video packet sink to receive video packets from each of said one or more video cameras; and a video camera backup apparatus coupled/connected/residing between each of the one or more video cameras and the video packet sink, wherein the backup apparatus may include: (1) a camera power-line monitoring circuit to detect an inoperable electrical power condition (IEPC) on a camera power-line; (2) a backup power source to provide electrical power to the camera upon detection of an IEPC; and/or (3) a video packet sink emulator adapted to emulate a video packet sink of the video camera upon detecting a connectivity fault between the video camera and the video packet sink.

According to some embodiments, an IEPC may include one or more conditions from the group consisting of: (1) power down, and/or (2) power drop. According to some embodiments, the power-line may be a Power over Ethernet (PoE) power-line. According to some embodiments, detection of power-loss on the PoE may indicate a connectivity fault between the video camera and the video packet sink. According to some embodiments, detection of power-loss on the PoE may trigger the video packet emulator to emulate the video packet sink. According to some embodiments, the sink emulator may include a digital data storage medium. According to some embodiments, the sink emulator may include a connectivity fault detector.

According to some embodiments of the present invention, an edge device power backup apparatus may comprise: a PoE line to charge a backup battery; a PoE line monitoring circuit to detect an inoperable electrical power condition (IEPC) on the PoE line; and/or the backup battery to provide electrical power via PoE to the PoE edge device upon detection of an IEPC. According to some embodiments, the apparatus may further comprise a packet sink emulator adapted to emulate a packet sink of the edge device upon detection of an IEPC. According to some embodiments, an IEPC may include one or more conditions from the group consisting of: (1) power down, and/or (2) power drop. According to some embodiments, detection of power-loss on the PoE may indicate a connectivity fault between the edge device and the edge device packet sink. According to some embodiments, detection of power-loss on the PoE may trigger the packet sink emulator to emulate the packet sink. According to some embodiments, the sink emulator may include a digital data storage medium.

According to some embodiments of the present invention, an edge device power backup apparatus may comprise: a PoE line to charge a backup battery; a PoE line monitoring circuit to detect an inoperable electrical power condition (IEPC) on the PoE line; a battery voltage booster to repetitively boost the voltage of said backup battery; and an electronic OR logic gate to switch from the PoE line input power to the boosted power of said backup battery, upon detection of an IEPC.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A System on Chip (SoC) for facilitating edge device backup, said SoC comprising:
    an Integrated Circuit (Chip) comprising:
        an input port to receive and connect to a Direct Current (DC) Power over Ethernet (PoE) input line originating at a PoE source;
        a PoE adapter to connect to said input port, separate power received over the PoE input line from data received over the PoE input line
        and output: (i) an internal power line carrying power received through the PoE power line and (ii) a data line carrying data received from the PoE source;
        a power-line monitoring circuit to detect an inoperable electrical power condition (IEPC) in the PoE input line;
        a PoE output adapter connected to said internal power line and to said data line and adapted to provide a PoE output line to the edge device, wherein the PoE output line carries data received through said data line and power received through said internal power line;
        a connection to a rechargeable backup power source to provide electrical power to the PoE output upon detection of the IEPC in the PoE input line; and a charging line connected to said internal power line and said backup power source and adapted to charge said backup power source using power from said internal power line.

2. The SoC according to claim 1, further comprising a port for receiving an auxiliary low voltage power line.

3. The SoC according to claim 2, wherein said SoC is also configured to charge said rechargeable backup power source using power from the auxiliary power line.

4. The SoC according to claim 2, wherein said SoC is also configured to provide power to the PoE output line from the auxiliary power line, upon detection of the IEPC in the PoE input line.

5. The SoC according to claim 1, further comprising a voltage step down converter for reducing voltage of the power received over the PoE line.

6. The SoC according to claim 1, further comprising a voltage step up converter for increasing voltage of power from the backup power source.

7. The SoC according to claim 1, further comprising an auxiliary power output for providing a low voltage DC power output separate from said PoE output line.

8. The SoC according to claim 7, wherein said auxiliary power output is powered by the PoE input line.

9. A System on Chip (SoC) for facilitating video camera backup, said SoC comprising:
an Integrated Circuit (Chip) comprising:
an input port to receive and connect to a Direct Current (DC) Power over Ethernet (PoE) input line originating at a PoE source;
a PoE adapter to connect to said input port, separate power received over the PoE input line from data received over the PoE input line and output: (i) an internal power line carrying power received through the PoE power line and (ii) a data line carrying data received from the PoE source;
a power-line monitoring circuit to detect an inoperable electrical power condition (IEPC) in the PoE input line;
a PoE output adapter connected to said internal power line and to said data line and adapted to provide a PoE output line to an associated video camera, wherein the PoE output line carries data received through said data line and power received through said internal power line;
a connection to a rechargeable backup power source to provide electrical power to the PoE output upon detection of the IEPC in the PoE input line; and
a charging line connected to said internal power line and said backup power source and adapted to charge said backup power source using power from said internal power line.

10. The SoC according to claim 9, further comprising a port for receiving an auxiliary low voltage power line.

11. The SoC according to claim 9, wherein said SoC is also configured to charge said rechargeable backup power source using power from the auxiliary power line.

12. The SoC according to claim 9, wherein said SoC is also configured to provide power to the PoE output line from the auxiliary power line, upon detection of the IEPC in the PoE input line.

13. The SoC according to claim 9, further comprising a voltage step down converter for reducing voltage of the power received over the PoE line.

14. The SoC according to claim 9, further comprising a voltage step up converter for increasing voltage of power from the backup power source.

15. The SoC according to claim 9, further comprising an auxiliary power output for providing a low voltage DC power output separate from said PoE output line.

16. The SoC according to claim 9, wherein said auxiliary power output is powered by the PoE input line.

17. The SoC according to claim 9, further comprising a video packet sink emulator adapted to emulate a video packet sink of the video camera.

18. The SoC according to claim 17, wherein detection of an IEPC triggers said video packet sink emulator to emulate the video packet sink.

19. The SoC according to claim 17, wherein said sink emulator includes a connectivity fault detector.

20. A video monitoring system comprising;
one or more video cameras;
a video packet sink to receive video packets from each of said one or more video cameras; and
a System on Chip (SoC) for facilitating video camera backup residing between one or more of said video cameras and said video packet sink, said SOC comprising:
an Integrated Circuit (Chip) comprising:
an input port to receive and connect to a Direct Current (DC) Power over Ethernet (PoE) input line originating at a PoE source;
a PoE adapter to connect to said input port and separate power received over the PoE input line from data received over the PoE input line and output: (i) an internal power line carrying power received through the PoE power line and (ii) a data line carrying data received from the PoE source;
a power-line monitoring circuit to detect an inoperable electrical power condition (IEPC) in the PoE input line;
a PoE output adapter connected to said internal power line and to said data line and adapted to provide a PoE output line to an associated video camera, wherein the PoE output line carries data received through said data line and power received through said internal power line;
a connection to a rechargeable backup power source to provide electrical power to the PoE output upon detection of the IEPC in the PoE input line; and
a charging line connected to said internal power line and said backup power source and adapted to charge said backup power source using power from said internal power line.

* * * * *